US007505914B2

(12) United States Patent
McCall

(10) Patent No.: US 7,505,914 B2
(45) Date of Patent: Mar. 17, 2009

(54) METHOD AND SYSTEM FOR PROVIDING ADVISORY INFORMATION TO A FIELD SERVICE PROVIDER

(75) Inventor: John E. McCall, West St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 1166 days.

(21) Appl. No.: 09/923,202

(22) Filed: Aug. 6, 2001

(65) Prior Publication Data

US 2003/0033156 A1  Feb. 13, 2003

(51) Int. Cl.
*G06Q 10/00* (2006.01)
(52) U.S. Cl. .......................................... 705/1
(58) Field of Classification Search ................ 705/1, 705/5.6, 8, 9; 706/55; 379/201.12
See application file for complete search history.

(56) References Cited

U.S. PATENT DOCUMENTS

| | | | |
|---|---|---|---|
| 4,241,400 A | 12/1980 | Kiefer | |
| 4,404,639 A | 9/1983 | McGuire et al. | |
| 4,482,785 A | 11/1984 | Finnegan et al. | |
| 4,509,543 A | 4/1985 | Livingston et al. | |
| 4,697,243 A | 9/1987 | Moore et al. | |
| 4,707,848 A * | 11/1987 | Durston et al. ............. | 379/1.01 |
| 4,756,321 A | 7/1988 | Livingston et al. | |
| 4,837,811 A | 6/1989 | Butler et al. | |
| 4,905,163 A * | 2/1990 | Garber et al. ................ | 706/55 |
| 5,014,211 A | 5/1991 | Turner et al. | |
| 5,036,479 A | 7/1991 | Prednis et al. | |
| 5,038,807 A | 8/1991 | Bailey et al. | |
| 5,043,860 A | 8/1991 | Koether et al. | |
| 5,136,281 A | 8/1992 | Bonaquist | |
| 5,203,366 A | 4/1993 | Czeck et al. | |
| 5,222,027 A | 6/1993 | Williams et al. | |
| 5,283,639 A | 2/1994 | Esch et al. | |
| 5,345,379 A | 9/1994 | Brous et al. | |
| 5,400,018 A | 3/1995 | Scholl et al. | |
| 5,467,268 A | 11/1995 | Sisley et al. | |
| 5,584,025 A | 12/1996 | Keithley et al. | |
| 5,619,183 A * | 4/1997 | Ziegra et al. ................ | 340/505 |
| 5,636,008 A | 6/1997 | LoBiondo et al. | |

(Continued)

FOREIGN PATENT DOCUMENTS

WO      WO 00/02371      *   1/2000

OTHER PUBLICATIONS

Sawyers, Arlena; Troubleshooting techs turn to Net; Apr. 1998; Automotive News, n5760, p. 24; dialog copy 3 pages.*

(Continued)

*Primary Examiner*—John W Hayes
*Assistant Examiner*—Rob Wu
(74) *Attorney, Agent, or Firm*—Shumaker & Sieffert, P.A.

(57) ABSTRACT

A network advisory system that provides advisory information to a field service provider is disclosed. The network advisory system receives collected data from one or more destination facilities and analyzes the information to generate advisory information. The advisory information is used by the field service provider to provide a service at the destination facility. The field service provider may receive the advisory information while in transit to the destination facility or while located at a destination facility. The field service provider receives the advisory information through a network connection. The network connection may be either a wireless connection or a land-based connection.

44 Claims, 9 Drawing Sheets

U.S. PATENT DOCUMENTS

| | | |
|---|---|---|
| 5,681,400 A | 10/1997 | Brady et al. |
| 5,694,323 A * | 12/1997 | Koropitzer et al. .......... 705/400 |
| 5,695,091 A | 12/1997 | Winings et al. |
| 5,724,261 A | 3/1998 | Denny et al. |
| 5,745,381 A | 4/1998 | Tanaka et al. |
| 5,757,664 A | 5/1998 | Rogers et al. |
| 5,758,300 A | 5/1998 | Abe |
| 5,761,278 A | 6/1998 | Pickett et al. |
| 5,821,523 A | 10/1998 | Bunte et al. |
| 5,826,270 A * | 10/1998 | Rutkowski et al. |
| 5,826,749 A | 10/1998 | Howland et al. |
| 5,839,097 A | 11/1998 | Klausner |
| 5,861,881 A | 1/1999 | Freeman et al. |
| 5,864,783 A | 1/1999 | Struck et al. |
| 5,875,430 A | 2/1999 | Koether |
| 5,931,877 A | 8/1999 | Smith et al. |
| 5,933,479 A | 8/1999 | Michael et al. |
| 5,939,974 A | 8/1999 | Heagle et al. |
| 5,945,910 A | 8/1999 | Gorra |
| 5,956,487 A | 9/1999 | Venkatraman et al. |
| 5,961,561 A * | 10/1999 | Wakefield, II ................ 701/29 |
| 5,963,911 A * | 10/1999 | Walker et al. |
| 5,967,202 A | 10/1999 | Mullen et al. |
| 5,973,696 A | 10/1999 | Agranat et al. |
| 5,975,352 A | 11/1999 | Spriggs et al. |
| 5,980,090 A | 11/1999 | Royal et al. |
| 6,003,070 A | 12/1999 | Frantz |
| 6,049,792 A | 4/2000 | Hart et al. |
| 6,061,668 A | 5/2000 | Sharrow |
| 6,073,124 A | 6/2000 | Krishnan et al. |
| 6,129,449 A | 10/2000 | McCain et al. |
| 6,314,422 B1 | 11/2001 | Barker et al. |
| 6,321,204 B1 | 11/2001 | Kazami et al. |
| 6,330,499 B1 | 12/2001 | Chou et al. |
| 6,343,251 B1 | 1/2002 | Herron et al. |
| 6,356,205 B1 | 3/2002 | Salvo et al. |
| 6,357,292 B1 | 3/2002 | Schultz et al. |
| 6,370,454 B1 | 4/2002 | Moore ........................ 701/29 |
| 6,377,868 B1 | 4/2002 | Gardner, Jr. ................ 700/236 |
| 6,418,371 B1 | 7/2002 | Arnold ...................... 701/117 |
| 6,438,471 B1 | 8/2002 | Katagishi et al. .............. 701/33 |
| 6,490,513 B1 | 12/2002 | Fish et al. .................... 701/35 |
| 6,697,706 B2 | 2/2004 | Gardner, Jr. |
| 6,735,293 B2 * | 5/2004 | Doherty et al. ......... 379/201.12 |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0096537 A1 | 7/2002 | Gardner, Jr. |

OTHER PUBLICATIONS

International Search Report dated May 19, 2003.
*We'd like to make a couple of things perfectly Clear*, Aquabalance Pool and Spa Management, Ecolab brochure, 1998 Ecolab Inc.
*White Paper, Ecolab Balancer.Com*, MRE Jun. 4, 1997.
*Relax. We've Got Your Pool Concerns Under Control*, Ecolab Water Care Services, 1998 Ecolab, Inc.

\* cited by examiner

METHOD AND SYSTEM FOR PROVIDING ADVISORY INFORMATION TO A FIELD SERVICE PROVIDER

CROSS REFERENCE TO RELATED APPLICATIONS

This application is related to subject matter disclosed in U.S. patent application Ser. No. 09/923,176 for a METHOD AND SYSTEM FOR PRESENTING CUSTOMIZED ADVISORY INFORMATION, and U.S. patent application Ser. No. 09/923,200 for a METHOD AND SYSTEM FOR PROVIDING MANAGEMENT INFORMATION, both of which are filed concurrently herewith, the subject matter of those applications is incorporated in this application by reference.

TECHNICAL FIELD

The invention relates generally to distributing information. More particularly, the invention relates to distributing advisory information remotely to a field service provider.

BACKGROUND OF THE INVENTION

Generally, field service providers (e.g., a field service technician) are persons employed to provide a service at a destination facility. The field service provider is typically employed by a service providing company, but may also be a contractor or an internal employee of the facility operator. On any given day, a field service provider may visit multiple destination facilities while providing various different services at each destination facility.

Regardless of the type of service to be provided and the destination facility to where a service is to be provided, it is generally helpful for the field service provider to receive information about the required or requested service prior to arrival at the destination facility. Currently, such advisory information is typically provided to the field service provider through interaction with another person, such as by telephone. Additionally, advisory information may be provided as the field service provider references a hard copy manual or printout.

Although these conventional methods have been used for many years, they are not without disadvantages. First, by interacting with another person, the advisory information provided to the field service provider is subject to human error. Furthermore, the cost of employing two employees—one a field service provider and the other providing advisory information to the field service provider—to provide a single service is a financial burden to the service providing company of which the persons are employed. Second, by referencing a hard copy manual or printout, the advisory information provided to the field service provider may not include the most recent information needed to satisfactorily provide the service.

More importantly, it is somewhat difficult and extremely dangerous for the field service provider to reference the hard copy manual or printout while in transit to a destination facility. Transit time is generally referred to as "windshield time" due to the fact that most field service providers spend that time traveling in a vehicle. Windshield time is typically time that cannot be charged to the customer by the service providing company. Likewise, time taken to reference a hard copy manual or printout is typically time that cannot be charged to the customer. If the field service provider attempts to reference the hard copy materials during windshield time, he/she is endangering not only his/her life, but also the life of others on the transportation routes. As such, to safely reference the hard copy during transit would require the field service provider to detour from the transportation route thereby resulting in even greater delays than the normal windshield time.

SUMMARY OF THE INVENTION

In accordance with the present invention, the above and other problems are solved by the network advisory system (hereinafter "NAS"). Generally, the NAS provides advisory information to a field service provider to assist the field service provider in providing a service at a destination facility. The field service provider may be employed by a service providing company to provide the service at the destination facility. As such, the destination location may be associated with either the service providing company or a customer of the service providing company employing the field service provider to provide service to the customer. The advisory information may take the form of scripts that are used by the field service provider to either provide a particular service at the destination facility or receive training in a specialized area of which the field service provider requests or requires instruction.

The advisory information may be generated from data conclusions derived from collected data associated with a utility device at a destination facility. The utility device may be any machine, apparatus or system serviced by the field service provider. The utility device may be leased or purchased from the service providing company and therefore located at a destination facility associated with the customer. The utility device may also be a device already owned by the customer at a time when the customer and the service providing company enter into an agreement for the service providing company to provide a service related to the device. Further, the utility device may also be the property of the service providing company at a destination location of the service providing company. Generally, the collected data includes device data associated with operating conditions of the utility device and account data associated with specific account and customer information. Account data may be broadly defined as all data not considered device data and may include, without limitation, business data related to invoice and financial information associated with the customer and/or utility device or census data related to an operational demand or supply associated with the utility device.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The great utility of the invention is that a field service provider may provide a service to a customer based on advisory information generated by an advisory module thereby alleviating potential for human error. Furthermore, the advisory information may be presented to the field service provider over any form of network connection through which the field service provider may connect to the computing module. As such, advisory information may be presented to a field service provider during windshield time, thereby optimizing productivity and efficiency of the field service provider.

These and various other features as well as advantages, which characterize the present invention, will be apparent from a reading of the following detailed description and a review of the associated drawings.

DETAILED DESCRIPTION

Figure 1:
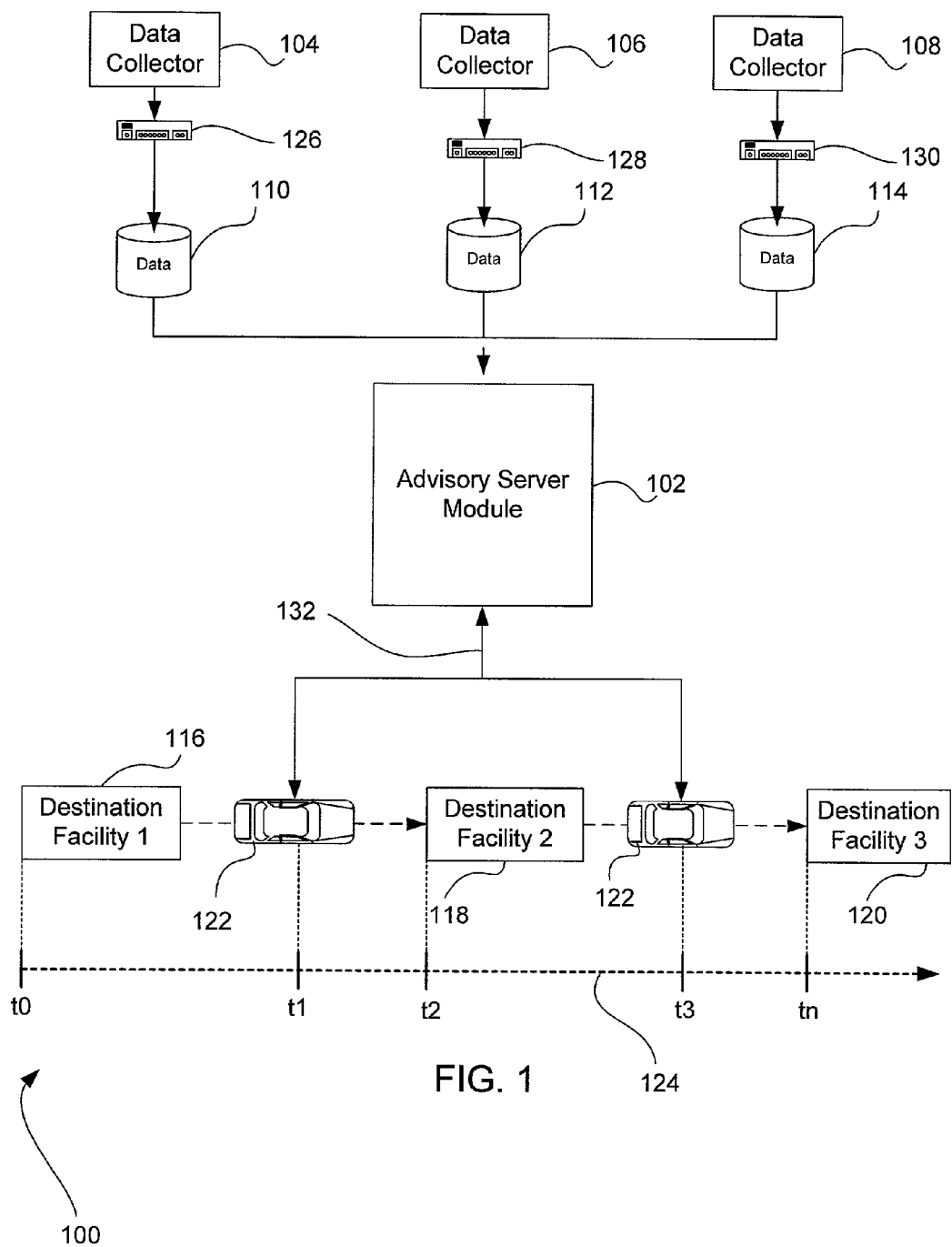
FIG. 1 is a functional diagram of a network advisory system in accordance with an embodiment of the present invention and the associated environment.

The present invention and its various embodiments are described in detail below with reference to the figures. When referring to the figures, like structures and elements shown throughout are indicated with like reference numerals.

Referring to FIG. 1, a conceptual illustration of an embodiment of the present invention is shown. FIG. 1 shows a network advisory system ("NAS") 100 that is responsible for collecting data associated with one or more destination facilities, i.e., 116, 118 and 120, and analyzing the data in order to provide advisory information to a field service provider 122 providing a service at the destination facility, such as destination facilities 116, 118 and 120. Although the field service provider 122 is shown in FIG. 1 as a person traveling between destination facilities, i.e., 116, 118 and 120, the field service provider 122 may be any system, device, or computing module capable of providing a service to a destination facility, i.e. 116, 118 or 120. The field service provider 122 may be employed by a service providing company to provide the service at the destination facility 116, 118 or 120. As such, the destination facility 116, 118 or 120 may be associated with either the service providing company or a customer of the service providing company employing the field service provider 122 to provide service to the customer. The advisory information may take the form of scripts that are used by the field service provider 122 to either provide a particular service at the destination facility 116, 118 or 120 or receive training in a specialized area of which the field service provider 122 requests or requires instruction. The scripts may be presented to the field service provider 122 in a binary textual, audio and/or visual format.

The service provided is described below as device and account maintenance related to the rental/leasing of a utility device, such as, without limitation, a ware washer, a vending machine, a laundry machine or any type of office equipment, farm equipment, medical equipment, computer equipment, or vehicular service equipment. However, it should be appreciated that the present invention encompasses any type of service of which the field service provider 122 may be employed to carry out the duties of the service, including, without limitation, upgrades, replacement, training, restocking, pest elimination, medical exams, and lawn care.

In an embodiment of the present invention, the NAS 100 is a computer network operated by an advisory module 102. The advisory module 102 comprises a server computer that receives data from data collectors, such as data collectors 104, 106 and 108. Even though the NAS 100 is shown having only three data collectors 104, 106 and 108, the NAS 100 may be implemented using any number of data collectors. Data collected by the data collectors 104, 106 and 108 is uploaded by one or more data transmitters, such as data transmitters 126, 128 and 130, to one or more databases, such as databases 110, 112 and 114, accessible to the advisory module 102. The collected data is then stored in the one or more databases, i.e. 104, 106 and/or 108, for a predetermined period of time.

The NAS 100 may be implemented with the data collectors 104, 106 and 108 and the data transmitters 126, 128 and 130 located at a specific destination facility 116, 118 or 120. The destination facility 116, 118 or 120 may be associated with a service providing company employing the field service provider 122 or a customer of the service providing company. A destination facility, i.e., 116, 118 or 120, is defined not based on where the customer or service providing company regularly conduct business, but instead is defined as the location at which the service is to be provided to the customer. As a means of example and not by limitation, the customer's destination facility 116, 118 or 120 is hereafter defined as the location where a utility device is located.

In accordance with a first embodiment, the field service provider 122 may be employed by a service providing company and the service providing company is employed to provide service to a utility device at one or more destination facilities, i.e., 116, 118 and/or 120, associated with a first customer. As such, the service providing company employs the field service provider 122 as an agent to provide the specified service. The data collectors 104, 106 and 108, the data transmitters 126, 128 and 130, and the databases 110, 112 and 114 may be located at either the destination facility 116, 118 or 120 associated with the first customer or a central location associated with the service providing company. As described below, the data collectors 104, 106 and 108 collect various forms of data including, without limitation, device data and account data. Whereas data collectors 104, 106 and 108 and data transmitters 126, 128 and 130 associated with device data are typically located at a destination facility, 116, 118 or 120, data collectors 104, 106 and 108 associated with account data are typically located a central location associated with the service providing company. As shown in FIG. 1, the field service provider 122 may be provided advisory information pertaining to the specified service while in transit to the destination facility. Alternatively, the field service provider 122 may be provided such advisory information while located at the destination facility 116, 118 or 120 or any other stationary location.

In accordance with a second embodiment, the field service provider 122 may be employed by a service providing company to provide service to a utility device at one or more destination facilities 116, 118 and/or 120 associated with the service providing company. As such, the service providing company employs the field service provider 122 as an employee to provide the specified service. The data collectors 104, 106 and 108, the data transmitters 126, 128 and 130, and the databases 110, 112 and 114 may be located at either the destination facility 116, 118 or 120 or a central location associated with the service providing company. As shown in FIG. 1, the field service provider 122 may be provided advisory information pertaining to the specified service while in transit to the destination facility 116, 118 or 120. Alternatively, the field service provider 122 may be provided such advisory information while located at the destination facility 116, 118 or 120 or any other stationary location. The field service provider 122 may also be an independent contractor hired to provide a specified service at a destination facility, i.e., 116, 118 or 120. As such, the field service provider 122 may be hired by either a service providing company or a customer of a service providing company.

As described, the utility device may be located at the destination facility 116, 118 or 120 and may be associated with the service providing company or a customer of the service providing company receiving the service. As such, the customer may have purchased or leased the utility device from the service providing company. Alternatively, the utility device may be a device already owned by the customer at a time when an agreement to service the device is executed between the service providing company and the customer.

The advisory module 102 receives data from the one or more databases 110, 112 and/or 114 storing the data and analyzes the data to produce advisory information to assist a field service provider 122 in providing one or more services at one or more destination facilities 116, 118 and/or 120. As mentioned, the advisory information may take the form of scripts that are used by the field service provider 122 to either provide a particular service at the destination facility 116, 118 or 120 or receive training in a specialized area of which the field service provider 122 requests or requires instruction. Further, the scripts may be customized messages formatted in language and/or content to each particular field service provider 122 and/or destination facilities 116, 118 and 120 where a service is to be provided. The advisory information may also take the form of hard data, such as the data collected by data collectors 104, 106 and 108.

In accordance with one embodiment, the advisory module 102 provides advisory information to the field service provider 122 as the field service provider 122 is in transit to a destination facility, i.e., 116, 118 or 120. As such, the field service provider 122 may be in transit between two destination facilities, i.e., 116, 118 and/or 120, as shown in FIG. 1. An illustration of the field service provider 122 being in transit is shown with reference to a time line 124. For example, in FIG. 1 the field service provider 122 is shown in transit between the first destination facility 16 and the second destination facility 118 at time $t_1$. Likewise, the field service provider 122 is shown in transit between the second destination facility 118 and the third destination facility 120 at time $t_3$. The time that the field service provider 122 is in transit between destination facilities 116, 118 or 120 is commonly referred to as "windshield time." By providing the field service provider 122 with advisory information during a windshield time, the field service provider 122 can receive information related to the next service to be provided at the next destination facility 116, 118 or 120 that the field service provider is to visit at a time that is relatively cost and time efficient. In accordance with a second embodiment, the advisory module 102 may provide advisory information to the field service provider 122 while the field service provider 122 is located at a destination facility, i.e., 116, 118 or 120, as shown at times to, $t_2$ and $t_N$ on the timeline 124.

Although FIG. 1 only depicts a first destination facility 116, a second destination facility 118 and a third destination facility 120, the NAS 100 may be used to provide advisory information to the field service provider 122 as the field service provider 122 is employed to provide a service at any number of destination facilities over a given time period. As such, FIG. 1 shows a time line 124 depicting specific times that illustrate the location of the field service provider 122 over a given period of time. For instance, at time $t_0$, the field service provider 122 would be providing a service at the first destination facility 116. At time $t_1$, the field service provider 122 is in transit between the first destination facility 116 and the second destination facility 118. Likewise, at time $t_2$, the field service provider 122 would be providing a service at the second destination facility 118. The time line 124 is therefore a continuous timeline beginning at time to and ending at a time $t_N$, which would be the final destination facility 120 visited by the field service provider 122 during a particular time period (shown in FIG. 1 as times $t_0$-$t_N$) during which the field service provider 122 is providing various services to multiple destination facilities, i.e., 116, 118 and 120. Accordingly, in FIG. 1, time $t_N$ represents the time that the field service provider 122 reaches the third destination facility 120.

The data collectors 104, 106 and 108 may collect any type of data that is useful to the field service provider 122 as the field service provider 122 is preparing to provide or currently providing a service at a destination facility, i.e., 116, 118 or 120. For example, but not by way of limitation, the data collectors 104, 106 and 108 may collect device data or account data related to a particular customer and/or utility device associated with a destination facility, i.e., 116, 118 or 120. Device data may be broadly defined as data associated with a utility device at a destination facility. Account data may be broadly defined as all data not considered device data and may include, without limitation, business data related to specific account, invoice or financial information associated with a customer and/or utility device and census data related to a specific demand or supply associated with a customer, and/or utility device. As an illustration, device and account data is described below as data related to a utility device, such as, without limitation, a ware washer, a vending machine, a laundry machine, a chemical dispenser or any type of office equipment, farm equipment, medical equipment, lawn/garden equipment, vehicular service equipment, computer and computer-related equipment, software, or security equipment. However, the data, particularly account data, may be related to any type of service of which a field service provider 122 may be employed to carry out duties of the service.

In accordance with an embodiment, device data is data that relates to operations of a particular utility device that the field service provider 122 may service at a destination facility, i.e., 116, 118 or 120. In particular, device data relates to parameters and operating conditions of the utility device located at a particular destination facility 116, 118 or 120. Using a conventional vending machine as an example of a utility device from which device data is taken, the device data may relate to the temperature inside the cooler of the vending machine.

As noted above, account data may include, without limitation, business data and census data. In accordance with an embodiment, business data is data that generally relates to customer account information specific to a particular customer account. For instance, specific account information may identify a particular time period during which a customer has retained the services of the service providing company in servicing a particular utility device. Business data may also include invoice or financial information associated with a particular customer account. Invoice information may be information relating to a past due amount owed by a customer on an account, the current account balance of a customer's account, or any other information relating to financial or credit information associated with a specific customer. Using a conventional vending machine as an example of a utility device stored at a destination facility associated with a customer and subject to servicing by the field service provider 122, business data may include data that shows the customer's balance on the lease of the vending machine is thirty days past due.

In accordance with an embodiment, census data generally relates to a demand or supply associated with a particular service. As such, many specific samples of collected data may fall under the definition of "device" data. For instance, using a conventional vending machine as an example of a utility device stored at a customer's destination facility, i.e., 116, 118 or 120, and subject to servicing by the field service provider 122, census and device data may both relate to information associated with the quantity of a particular product that is sold through the vending machine during a specified time period. Likewise, if the utility device serviced by the field service provider 122 is a laundry machine, census and device data may both illustrate the amount of laundry detergent used by the customer over a specified time period. For reasons of example and not limitation, any type of data related to a supply or demand associated with a utility device is hereafter described as census data and any type of data related to actual structures (electrical, mechanical, etc.) or operating conditions (water temperature, revolutions per minute, etc.) of a utility device is hereafter described as device data.

In accordance with a first embodiment, the data collectors 104, 106 and 108 collect various types of data from a single destination facility 116, 118 or 120. For instance, the first data collector 104 may collect device data related to a vending machine located at the first destination facility 116 and the second data collector 106 may collect business data related to rental of the vending machine at the first destination facility 116. In accordance with a second embodiment, the data collectors 104, 106 and 108 may collect data specific to separate destination facilities, i.e., 116, 118 and 120. For instance, the first data collector 104 may collect data specific to the first destination facility 116, the second data collector 106 may collect data specific to the second destination facility 118 and the third data collector 108 may collect data specific to the third destination facility 120.

Regardless of which embodiment is employed, data is collected from the data collectors 104, 106 and 108 and provided to the advisory module 102 via data transmitters 124, 126 and 128. The data transmitters 124, 126 and 128 are responsible for uploading data collected by the data collectors 104, 106 and 108 to one or more databases, such as databases 110, 112 and 114 accessible to the advisory module 102. The location of the databases 110, 112 and 114 is immaterial so long as the databases 110, 112 and 114 are accessible to the advisory module 102. Further, the databases 110, 112 and 114 may be replaced by or part of a single master database 208, as shown and described in FIG. 2. The advisory module 102 retrieves data stored in the one or more databases 110, 112 and/or 114 and uses the data to generate advisory information.

After a sample of data is received, the advisory module 102 analyzes the data to generate a data conclusion. Data conclusions are independent conclusions or determinations derived from an analysis and/or manipulations of the collected data against advisory rules associated with a particular data type of the sample of data. The data type is generally defined by the form or subject matter (i.e., device, business, census, etc.) of the data and more specifically defined by the source from where the data originates. Indeed, data type may be identified in general as device or account data, more specifically as device, census or business data, and even more specifically as sub-data types of device, census or business data. As such, in pairing collected data to an advisory rule to analyze the data against the rule to generate a data conclusion associated with the data, a general data type and a specific data type of the data are used to match the data to the appropriate advisory rule. For instance, data taken from a conventional laundry machine may be generally identified as device data and specifically identified as relating to the water temperature of the wash cycles. As such, the specific data type is associated with water temperature of a wash cycle and used in determining which advisory rule the data is to be analyzed against.

Each advisory rule includes at least one advisory condition to which collected samples of data are analyzed against. The advisory conditions are used to compare collected samples of data to operating and/or threshold parameters associated with the data type of the data being manipulated. Once derived, the data conclusions are thereafter mapped to specific advisory information capable of relating the conclusions to the field service provider 122 in a manner such that the field service provider 122 may use the collected data to provide a particular service at a destination facility based on the advisory information. As mentioned, the advisory information may take the form of scripts that are used by the field service provider 122 to either provide a particular service at the destination facility 116, 118 or 120 or receive training in a specialized area of which the field service provider 122 requests or requires instruction.

In accordance with an embodiment, the advisory information may be customized based on the particular destination facility 116, 118 or 120 and the particular field service provider 122 providing the service at the facility 116, 118 or 120. Furthermore, the advisory information generated by the advisory module 102 may also be customized to the natural language of the field service provider 122. As mentioned, the advisory information may be associated with business, census, or device information related to providing a specific service to a specific customer associated with the destination facility 116, 118 or 120. The advisory information may also be associated with training or instruction information requested or required by the field service provider 122. Such training or instruction may or may not be related to any particular customer.

As described above, the advisory information may also be customized based on the destination facility 116, 118 or 120 that is to receive a service by the field service provider 122 and the particular field service provider 122 requesting access to the advisory information through the NAS 100. The operations used in accessing the advisory information are described in more detail below in FIGS. 3 and 9. By customization, the advisory information may be formatted not only on the customer associated with the destination facility 116, 118 or 120 and the field service provider 122 providing the service to the customer, but also the subject matter of the service to be provided by the field service provider 122. The subject matter, or content, of the service relates to the general type of data that the advisory information is associated with. For instance, if the field service provider 122 is located at time to in FIG. 1 and servicing a vending machine located at the first destination facility 116, the subject matter of the advisory information may be related to either device data, census data, or business data based on the objective of the service currently being provided at the first destination facility 116. As an example, at time $t_0$, the field service provider 122 may be replenishing a product covered by a vending machine located at the first destination facility 116. Accordingly, the advisory information accessed by the field service provider 122 may detail the number of products currently stored in the vending machine so that the field service provider 122 may predetermine how many products are needed to replenish the vending machine. As another example, if the subject matter of the advisory information relates to business data, then the objective of the service may be to collect a past due amount from a customer of the destination facility. In such a case, the advisory information may relate a balance of the past due amount to the field service provider 122.

Figure 2:
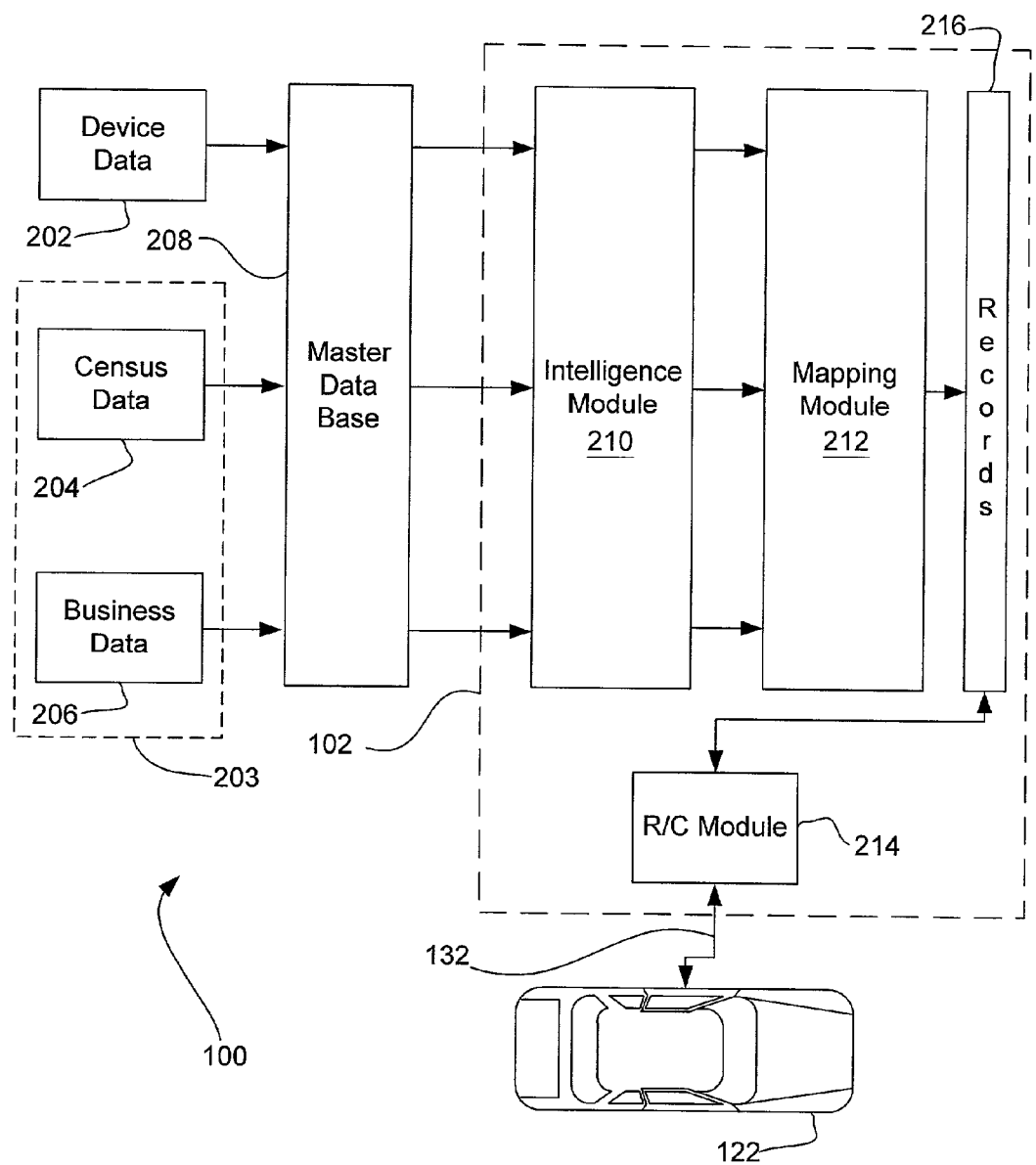
FIG. 2 is a simplified block diagram that illustrates functional components of a network advisory system such as the network advisory system in FIG. 1, in accordance with an embodiment of the present invention.

Referring now to FIG. 2, an illustration of the NAS 100 incorporating data from a destination facility associated with a single customer employing a service providing company to provide a service is shown in accordance with an embodiment of the present invention. As an example to illustrate the NAS 100 as shown in FIG. 2 and not by way of limitation, the customer is provided a service at the destination facility, i.e., 116, 118 or 120, by a field service provider 122 under employment of the service providing company. The NAS 100 compiles and stores device data 202 and account data 203 including, without limitation, census data 204 and business data 206, in a master database 208. In a first embodiment, the master database 208 may contain separate records for storing the separate general types of data, i.e., device data 202, census data 204 and business data 208. In a second embodiment, the master database 208 is replaced by multiple databases, such as the databases 110, 112 and 114 shown in FIG. 1, with each database storing a separate type of data. As such, a device data database may store device data 202, a census data database may store census data 204 and a business data database may store business data 206. Data 202, 204 and 206 are collected from data collectors, such as data collectors 104, 106 and 108. The data collectors 104, 106 and 108 may be located at the destination facility, such as 116, 118 and 120. Alternatively, the data collectors 104, 106 and 108 may be located at a central location of the service providing company.

As an example to illustrate the present invention and not a limitation, FIG. 2 is described with reference to a field service provider 122 providing service to a leased utility device located at a customer's destination facility. More particularly, the leased utility device in this example is a laundry machine. As such, device data 202 from the laundry machine is illustrated in FIG. 2 as relating to the water temperature in a wash basket of the machine; census data 204 is illustrated in FIG. 2 as relating to the amount of laundry detergent used by the customer over a specified period of time; and business data 206 is illustrated in FIG. 2 as relating to invoice information concerning the lease of the laundry machine.

Device data 202, census data 204 and business data 206 are received into the master database 208 and stored in the database 208 until such time that the data is to be analyzed by the advisory module 102. In accordance with an embodiment of the invention, the advisory module 102 is constructed with an intelligence module 210 and a mapping module 212. The intelligence module 210 formulates the device data 202, the census data 204 and the business data 206 into data conclusions by analyzing the data against advisory rules.

As mentioned above, data conclusions are independent conclusions or determinations derived from the collected data. The data conclusions are derived based on the data type of the collected data, i.e., whether the data is device, account, or census data. As such, the data conclusions are determined based on an analysis against an advisory rule associated with each specific data type. As noted above, each advisory rule includes at least one advisory condition and each advisory condition relates a collected sample of data to one or more operating and/or threshold parameters. For example, if the device data 202 shows that the machine-wash temperature is 80 degrees Fahrenheit, the intelligence module 210 may compare the machine-wash temperature to a temperature range of 75 to 90 degrees Fahrenheit to conclude that the temperature of the machine-wash is within the operating limits required of the machine. Likewise, if the census data 204 shows that the customer has used 1000 packages of laundry detergent within a one month time period, the intelligence module 210 may compare this quantity of use to a quantity of 800 packages to conclude that the customer requires a greater quantity of laundry detergent for the next months supply.

Table 1, which further illustrates the device data example of FIG. 2, shows a listing of data conclusions generated by the intelligence module 210 along with the advisory conditions used in generating each conclusion. The variable "X" represents the temperature of the normal cycle machine-wash taken at time $T_{MW}$ and the variable "Y" represents the temperature of the final rinse taken at time $T_{FR}$. Both "X" and "Y" are temperatures of water in Fahrenheit.

TABLE 1

| Factor | Data Conclusion |
| --- | --- |
| If X ≦ 75 | 00 |
| If 75 < X < 90 | 01 |
| If X ≧ 90 | 02 |
| If Y ≦ 60 | 03 |
| If 60 < Y < 75 | 04 |
| If Y ≧ 75 | 05 |

Once generated by the intelligence module 210, the data conclusions are provided to a mapping module 212 that maps advisory information to each data conclusion. In accordance with an embodiment of the invention, the advisory information may take the form of a specific script illustrative of the data type of each data conclusion. As such, the advisory information is hereinafter described in conjunction with FIG. 2 as a script. A script is a predefined binary, textual, audio and/or visual message that relates to the data conclusion to a format recognizable to the field service provider 122.

Each data conclusion is associated with one or more particular scripts recognized by the mapping module 212. Table 2, which further illustrates the device data 202 example of FIG. 2, shows a mapping of scripts to the data conclusions shown in Table 1. As mentioned, the scripts in Table 2 are illustrated as being either audio or textual. In accordance with an embodiment, audio scripts may be predefined .WAV files. Furthermore, textual scripts may be formatted in a conventional character set.

Although Table 2 only depicts audio or textual scripts mapped to data conclusions, it should be appreciated that the scripts may be audio/visual. For instance, the audio/visual scripts may be in Moving Picture Experts Group (MPEG) standards format or some variation thereof. Indeed, audio/visual scripts are particularly beneficial under circumstances where the field service provider 122 connects to the NAS 100 through the Internet or a personal digital assistant (PDA) having wireless visual capabilities. Furthermore, the scripts in Table 2 are shown as single phrases for simplicity of this example. Generally, however, a script may comprise binary, textual, audio and/or visual messages having multiple phases or frames.

TABLE 2

| Data Conclusion | Scripts |
| --- | --- |
| 00 | "The machine-wash temperature is below the expected temperature range." |
| 01 | "The machine-wash temperature is within the expected temperature range." |
| 02 | "The machine-wash temperature is above the expected temperature range." |
| 03 | "The final rinse temperature is below the expected temperature range." |
| 04 | "The final rinse temperature is within the expected temperature range." |
| 05 | "The final rinse temperature is above the expected temperature range." |

In accordance with one embodiment, the scripts may be transmitted from the mapping module 212 to a storage module 216. The storage module 216 may be a timed-buffer or FIFO containing a predetermined number of records based on the number of customers of the service providing company and the number of accounts held by each customer. Because the storage module 216 is a timed-buffer, records in the storage module 216 are continuously erased as new data is collected and conclusions are generated and mapped to scripts by the advisory module 102. As such, the records may be written over with new data every 24 hours. In accordance with other embodiments, the tome period of which the scripts are stored in the records may be any given length of time. This length of time is generally dependent upon the type of service sought by the customer and the frequency to which that service is to be provided. Alternatively (see FIG. 6), the scripts may be transmitted from the mapping module 212 directly to a field service provider 122 without passing through the storage module 216.

In an embodiment of the present invention, a field service provider 122 signs on to the NAS 100 by connecting to a registration/communication ("R/C") module 214 through a network connection 132. The field service provider 122 may connect to and access the NAS 100 through any type of network device including, without limitation, a cellular telephone, a personal digital assistant (PDA), a laptop computer, a desktop computer, a land-line based telephone, a kiosk or any other network device that allows a user to communicate with the advisory server module 102 while connected through the network connection 132. As noted, the network connection 132 may be either a land-based connection or a wireless connection. Additionally, the network connection 132 may be a combination of a land-based and a wireless connection, such as the case where a wireless PDA connects to an Internet service provider (ISP) which is connected via a land-based connection to the NAS 100.

Using the network device, the field service provider 122 inputs information to communicate with the advisory server module 102 through a human interface device or module. The human interface device may be any number of interface devices based on the network device through which the field service provider 122 is connected to the network connection 132. By way of illustration and not limitation, in cases where the network device is a computer (laptop or desktop), the human interface device may be a keyboard, a mouse, a joystick, a touch screen or any other similar user interface device operably connected to the computer and capable of transmitting and receiving information to and from a network server or remote computer.

Once a field service provider 122 is identified by the R/C module 214, the module 214 transmits the appropriate scripts requested or required by the field service provider 122 based upon authentication and identification information input by the field service provider 122. As mentioned, the data type of the script(s) may be categorized as device data 202, census data 204, or business data 206. Once the customer account and data type is determined, appropriate scripts are retrieved from the storage module 216 and transmitted to the field service provider 122 over the network connection 132. As shown in FIG. 1, at times $t_1$ and $t_3$, the field service provider 122 may access the NAS 100 while in transit between destination facilities, i.e., 116, 118 and/or 120. Alternatively, the field service provider 122 may access the NAS 100 as the field service provider 122 is located at a customer's destination facility.

Figure 3:
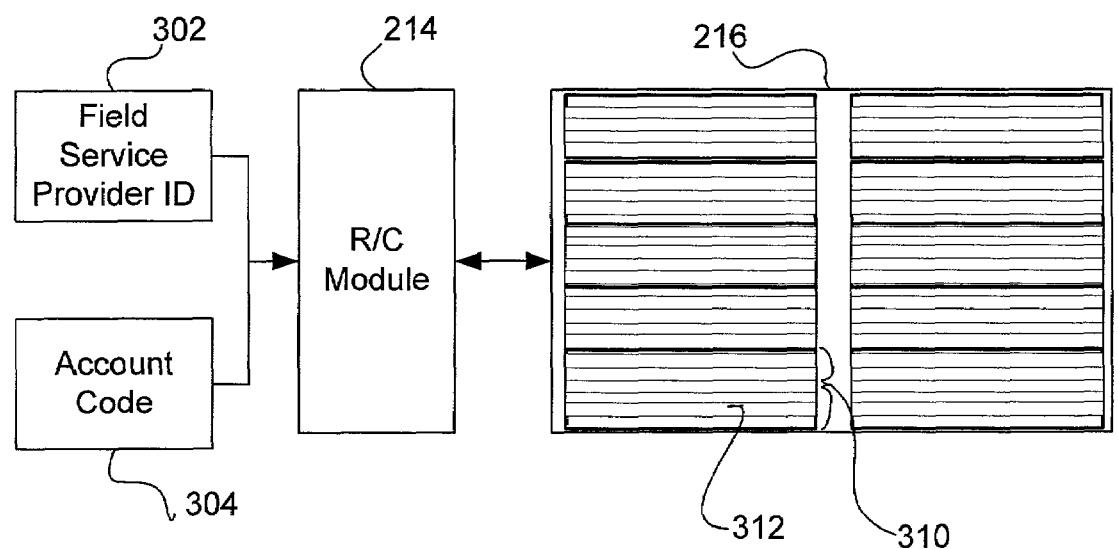
FIG. 3 is a functional diagram of a registration/communication module and a storage module of the network advisory system shown in FIG. 2 in accordance with an embodiment of the present invention.

FIG. 3 illustrates components of an R/C module 214 through which a field service provider 122 accesses a NAS 100 in accordance with an embodiment of the present invention. As an example and not by means of limitation, the advisory information provided by the NAS 100 to the field service provider 122 may take the form of a script. As such, FIG. 3 is described as providing scripts to the field service provider 122 once the provider 122 is granted access to the NAS 100 by the R/C module 214. In accordance with an embodiment, the transmittal of a specific script by the NAS 100 to the field service provider 122 is based on data type information defined by a provider identifier, which in an exemplary embodiment is an identification code 302 assigned to the field service provider 122, and an account identifier, which in an exemplary embodiment is customer account code 304 assigned to the particular account of the entity—either a customer or a providing company—associated with the destination facility, i.e., 116, 118 and 120, receiving the service. As an example to illustrate FIG. 3, the destination facility, i.e., 116, 118 or 120, receiving the service is described as a destination facility associated with a customer of a service providing company. As such, a field service provider 122 provides the service as an agent of the service providing company. In accordance with other embodiments, the destination facility, i.e., 116, 118 or 120, may be associated with the service providing company. Regardless of the embodiment, each destination facility, i.e., 116, 118 and 120, may be associated with one or more customer account codes 304.

The customer account code 304 identifies both the entity receiving the service and a specific account of the customer to which a service is to be provided. Hence, the customer account code 304 may specify the service providing company or a customer of the service providing company. The customer account code 304 may be one parameter used by the R/C module 214 to specify the appropriate scripts to be provided to the field service provider 122. Further, the customer account code 304 may identify a specific service to be provided to the customer identified by the customer account code 304. As described below, a customer may be associated with multiple customer account codes 304, with each customer account code 304 relating to a specific utility device. The specific utility devices may be of the same type or of different types; however, even if the utility devices are of the same type, data may be collected from and scripts may be provided based on separate customer account codes 304.

As mentioned, the field service provider 122 accesses the NAS 100 by first connecting to the R/C module 214 through some type of network connection 132. The network connection 132 may be a wireless connection. The network connection 132 may also be a landline connection, such as through the Internet or a land-based telephone line. As described above, if the network connection 132 allows the transfer of visual scripts, the scripts transmitted to the field service provider 122 are preferably formatted as audio/visual scripts. Hence, whereas the data-type of the scripts is determined based on the identification code 302 and the customer account code 304, the formatting, i.e., binary, textual, audio or audio/visual, of the scripts may be determined by the type of network connection 132 through which the field service provider 122 is connected to the R/C module 214.

Once connected to the R/C module 214, the field service provider 122 inputs the identification code 302 and the customer account code 304 specific to the customer account receiving the services of the field service provider 122. As mentioned, the customer account code 304 is a string of any number of characters—letters or numbers—recognized by the R/C module 214 as specifying a particular customer and service to be provided. The customer account code 304 is specific to the customer in that no two customer accounts, and therefore no two customers, of the service providing company are identified using the same customer account code 304. Thus, the customer account code 304 not only identifies a particular customer, but also identifies a specific account for the customer. For instance, a customer may lease a laundry machine and a vending machine from the service providing company. As such, the customer account code 304 associated with the laundry machine is preferably identified using a different character string than the customer account code 304 associated with the vending machine. For instance, the customer account code 304 for the laundry machine may be "00001.001," whereas the customer account code 304 for the vending machine may be "00001.002." Further, illustrating the example, whereas the first five characters represent the customer code for the specific customer, the last three characters, "001" and "002," represent the specific accounts of the customer identified by "0.00001."

Likewise, the identification code 302 is a string of any number of characters—letters or numbers—recognized by the R/C module 214 as specifying a particular field service provider 122. The identification code 302 is specific to the field service provider 122 such that no other field service provider 122 employed by the providing company is identified by that identification code 302. Because the identification code 302 is specific to each field service provider 122, each identification code 302 may be recognized by the R/C module 214 as identifying the field service provider 122 as a specialist in a particular service area. For instance, the R/C module 214 may identify the field service provider 122 as a ware washer repairman based on the identification code 302. In accordance with one embodiment, the field service provider 122 is a person and the identification codes 302 for each field service provider 122 employed by the service providing company are set up such that the first two characters identify each provider 122 as belonging to a specific specialty area as shown below in Table 3. Additionally, the identification codes 302 for each field service provider 122 may be set up such that the characters to the right of the specialty identifier distinguish each person individually. In the illustrations shown in Tables 3 and 4, an example identification code may be "XXYYYY" where "XX" identify the field service provider 122 by specialty area and "YYYY" identifies the field service provider 122 individually. Hence, as an example, the identification code 302 referenced as "020002" identifies John Smith and the fact that Mr. Smith is an account/invoice specialist.

TABLE 3

| Specialty Identifier ("XX") | Specialty Area |
|---|---|
| 00 | Ware washer technician |
| 01 | Vending machine re-supplier |
| 02 | Account/Invoice Specialist |
| . | . |
| . | . |
| . | . |
| 99 | HVAC technician |

TABLE 4

| Individual Identifier ("YYYY") | Individual |
|---|---|
| 0001 | John Doe |
| 0002 | John Smith |
| . | . |
| . | . |
| . | . |
| 9999 | Jane Smith |

Figure 6:
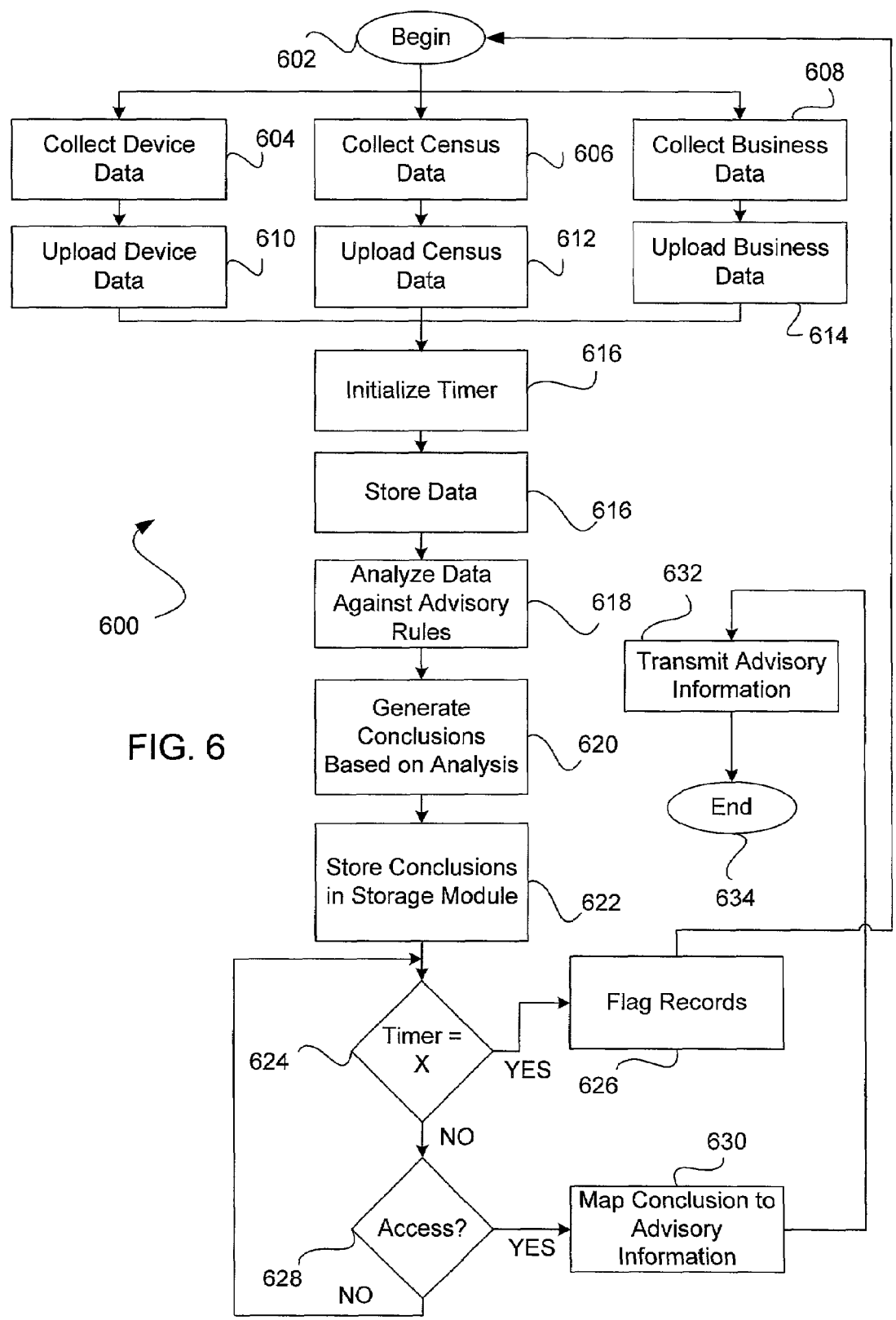
FIG. 6 is a flow diagram that illustrates operational characteristics shown in FIG. 4 in more detail in accordance with an alternative embodiment of the present invention.

The records of the storage module 216 are designed such that each customer is identified with one or more account records 310 (FIG. 3). The customer account records 310 are preferably identified by the R/C module 214 based on a specific customer account code 304 of the customer that the record is associated with. Thus, a customer may be associated with as many customer account records 310 as the customer has accounts, and thus customer account codes 304. Each customer account record 310 is further divided into data-type records 312 (FIG. 3) that store data-type specific scripts. In accordance with an embodiment, each customer account record 310 contains a device data record, a census data record and an business data record for storing scripts derived from device data 202, census data 204 and business data 206, respectively. As described in more detail in FIG. 9, the R/C module 214 accesses the appropriate customer 310 and data type 312 records based upon the identification code 302 and the customer account code 304 input by the field service provider 122. The R/C module 214 then retrieves the script stored in the accessed data-type record 312 and transmits the retrieved script to the field service provider 122. Alternatively, the scripts may be mapped once the field service provider 122 accesses the appropriate data-type record 312 as shown in FIG. 6 in accordance with this alternative embodiment.

A computing device, such as advisory module 102, typically includes at least some form of computer-readable media. Computer readable media can be any available media that can be accessed by the advisory module 102. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the advisory module 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
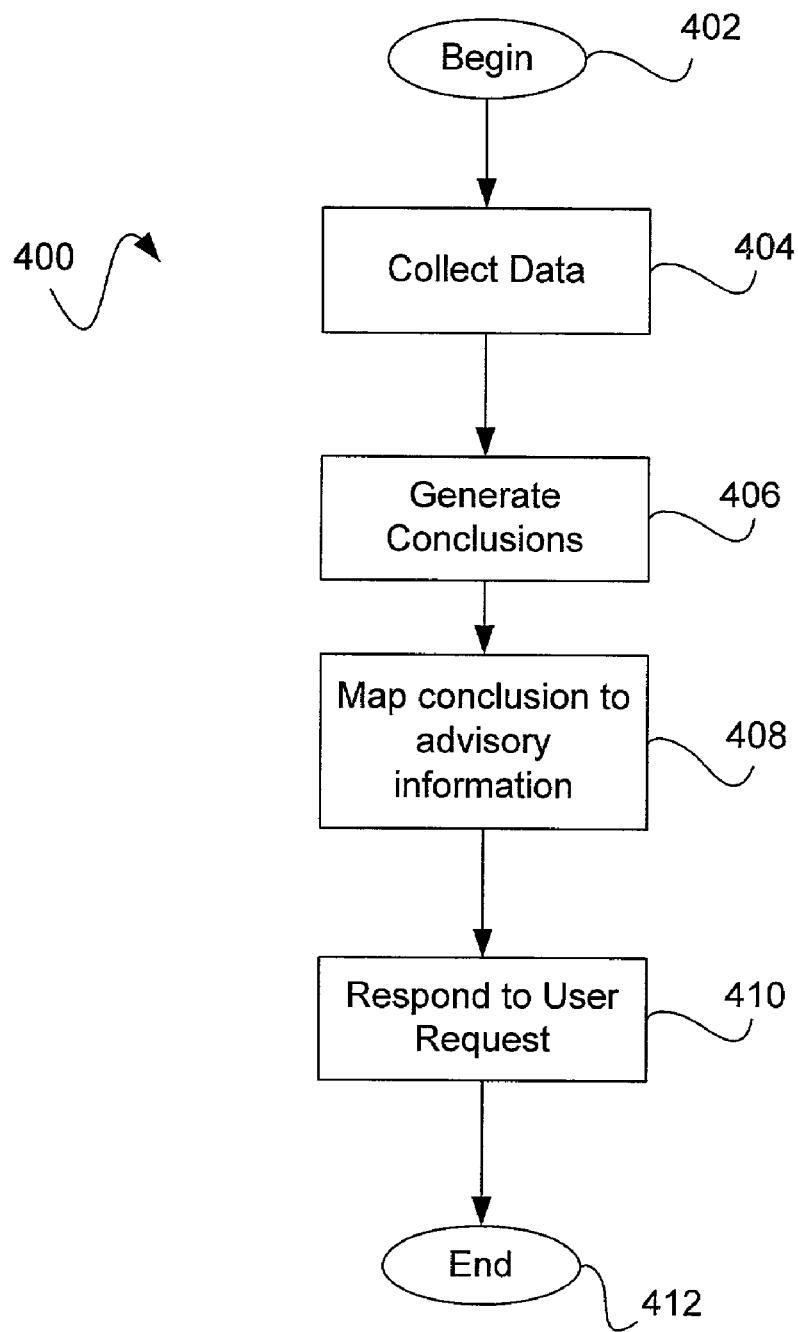
FIG. 4 is a flow diagram that illustrates operational characteristics for generating and providing advisory information in accordance with an embodiment of the present invention.

A network advisory process begins once a field service provider 122 connects with the registration/communication module 214 through a network connection 132. As noted above, the R/C module 214 is the interface of the NAS 100 through which the field service provider 122 accesses the NAS 100. As such, the field service provider 122 connects and communicates with the R/C module 214 through the use of a network device having a human interface module. Through the R/C module 214 the user will sign on as a user of the NAS 100. FIG. 4 illustrates operations performed by the NAS 100 as the NAS 100 administers a network advisory process in accordance with one embodiment of the present invention.

Referring to FIG. 4, a network advisory process 400 generally illustrating operations for generating and providing advisory information to a field service provider 122 through the NAS 100 is shown in accordance with an embodiment of the present invention. The network advisory process 400 comprises an operation flow beginning with start operation 402 and concluding with termination operation 412. For simplicity, the network advisory process 400 is described below as collecting data samples associated with a single type of data from a single destination facility, i.e., 116, 118 or 120. Moreover, the destination facility 116, 118 or 120 is described below as being associated with a customer of a service providing company employing the field service provider 122 to provide a service to the customer on behalf of the company. Generally, however, the NAS 100 may be used to simultaneously collect various forms of data from multiple destination facilities, i.e., 116, 118 and/or 120, serviced by the providing company. Furthermore, for each destination facility, i.e., 116, 118 and 120, serviced by the service providing company, there are generally two forms of data that are collected: device data 202 and account data 203, which includes, without limitation, business data 206 and census data 204.

Operation flow begins in start operation 402 and continues to collection operation 404. Collection operation 404 collects data from the destination facility 116, 118 or 120. As an example, and not by way of limitation, collection operation 404 collects data associated with a utility device to which a service is provided by a field service provider 122 employed by the service providing company. More specifically, the flow diagram 400 is hereafter described with reference to the utility device being an industrial laundry machine. As such, device data collected may relate to machine-wash temperature, business data collected may relate to the balance due on a lease of the laundry machine and census data collected may relate to the amount of laundry detergent used in the laundry machine over a given period of time.

Once data is collected in collection operation 404, operation flow passes to generation operation 406. Generation operation 406 generates data conclusions by analyzing the collected data of each data type against advisory rules associated with each specific data type. The collected data are analyzed against the advisory rules to generate conclusions illustrative of the results of the analysis. Each advisory rule includes at least one advisory condition relating a collected sample of data to one or more operating and/or threshold parameters associated with the general and specific data type. The analysis may be as simple as a comparison of a single sample of collected data to operating and/or threshold parameters of a single advisory condition or as complex as an interpretation of multiple samples of collected data against a complex set of advisory rules each having multiple advisory conditions to which the data are analyzed against.

As an illustration of a simpler example, device data 202 collected by collection operation 404 may be compared to operating parameters associated with a predefined water temperature range associated with the machine-wash cycle. The data conclusion will thus specify whether the device is operating properly, i.e., whether the machine-wash temperature is too hot or too cold.

As an illustration of a more difficult example, multiple samples of device data 202 associated with a conventional warewashing machine may be analyzed together against a complex set of advisory rules to generate one or more conclusions. Conventional warewashing machines typically include a wash reservoir, a rack conveyor, and a final rinse manifold. The samples of device data characterize warewasher operating conditions, such as, without limitation, detergent usage and concentration, wash tank temperature, final rinse pressure, and final rinse temperature. Each change in final rinse temperature may indicate that a rack of dishes is passing through the machine. For each rack passing through the machine, the dishes are sprayed with a constant volume of final rinse water that flows off the dishes and into the wash tank. As final rinse water flows into the wash tank reservoir, the tank level rises thereby overflowing into a discharge pipe. The additional water volume dilutes the detergent concentration, requiring the addition of more detergent. Under stable operating conditions, the amount of detergent added, over time, is directly proportional to the number of racks processed, as measured by the number of times the final rinse is activated.

The fact that detergent usage, as measured by empty container alarms, is out of line with respect to the number of racks washed may be an indication that the fill valve to supply fresh water to the wash tank reservoir is leaking or stuck in an open position. As such, each independent parameter, detergent usage and final rinse activation may be analyzed against multiple advisory rules for a particular machine configuration. This analysis generates one or more data conclusions that may suggest to the service provider whether there exists a leak in the wash tank fill valve.

Once generation operation 406 has generated data conclusions for the collected data, operation flow passes to map operation 408. Map operation 408 maps the data conclusions generated by generation operation 406 to advisory information that relates the data conclusions to a format recognizable to a field service provider 122. In accordance with an embodiment, the advisory information may take the form of scripts, which are customized messages defined in a textual or an audio and/or visual format.

Operation flow passes from map operation 408 to response operation 410 once the field service provider 122 accesses to the NAS 100 through a network connection 132. As mentioned, the network connection 132 is preferably a wireless connection, but may be any type of network connection 132 allowing connection to a remote computer. The network connection 132 may also be a landline connection, such as the Internet. Response operation 410 guides the field service provider 122 through the network advisory process 400. To gain access, once the field service provider 122 connects to the NAS 100 by inputting valid authentication and identification information through the R/C module 214. Upon entering a valid identification code 302, the field service provider 122 is authenticated and allowed to log on the NAS 100 as a user.

In order to request specific advisory information, the field service provider 122 inputs a customer account code 304. As described below and throughout the specification, the customer account code 304 identifies a specific customer account to which the field service provider 122 is to provide a service. Broadly defined, the customer account code 304 may be used to identify a specific destination facility, i.e., 116, 118 or 120, regardless of whether that destination facility 116, 118 or 120 is associated with a particular customer.

Response operation 410 responds with the appropriate advisory information based on the identification code 302 of the field service provider 122 and the customer account code 304. Specifically, the customer account code 304 specifies the customer account record 310 for response operation 410 to access and the identification code 302 specifies the data-type record 312 for response operation 410 to access based on the area of specialty of the field service provider 122. Once response operation 410 has accessed the appropriate data-type record 312 and transmitted the advisory information stored in the record 312 to the field service provider 122, operation flow concludes with termination operation 412.

Figure 5:
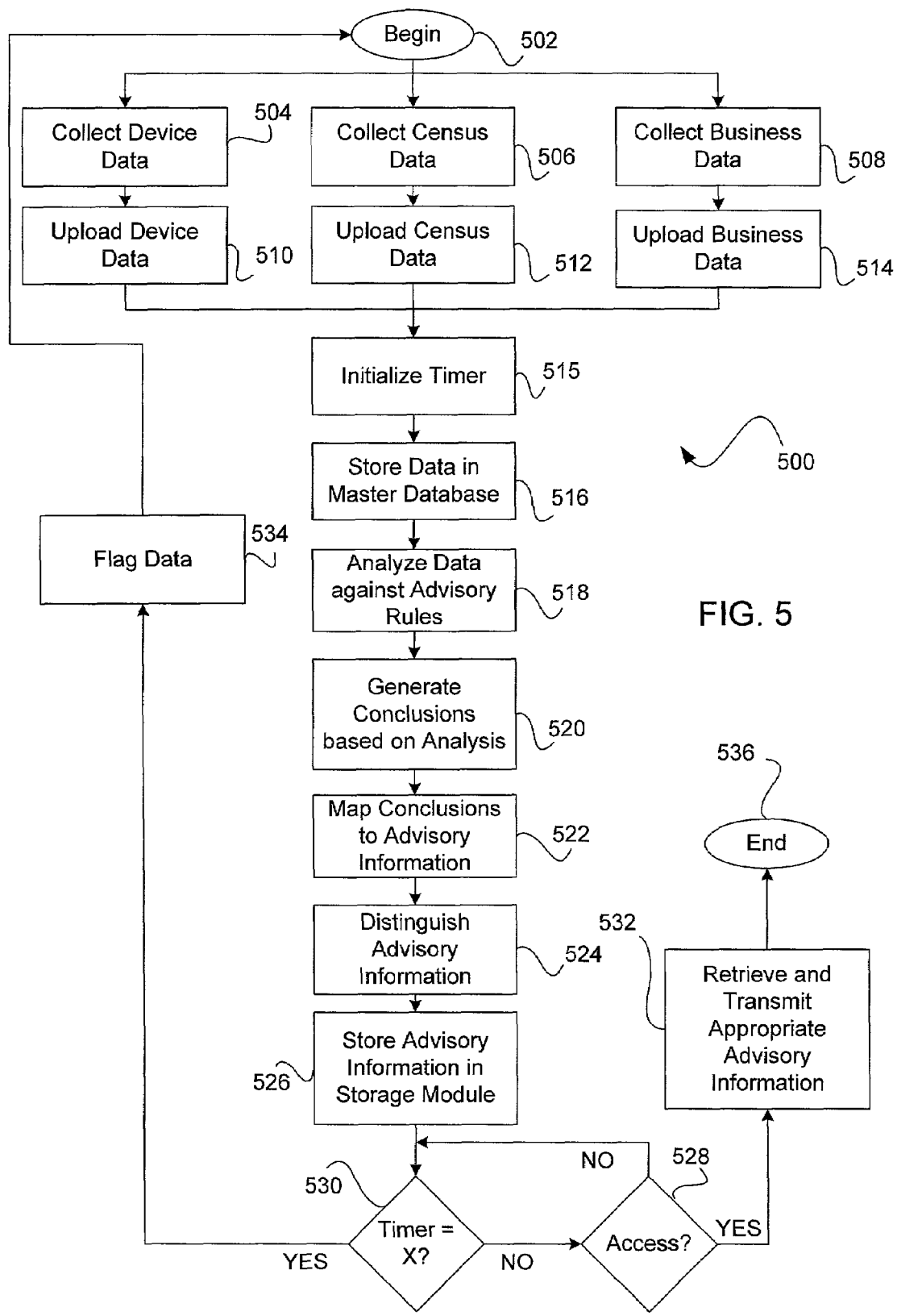
FIG. 5 is a flow diagram that illustrates operational characteristics shown in FIG. 4 in more detail in accordance with an embodiment of the present invention.

FIG. 5 is a network advisory process 500 more particularly illustrating the operations shown in the network advisory process 400 as the NAS 100 generates and provides advisory information to a field service provider 122 in accordance with an embodiment of the present invention. As an example and not a limitation, the network advisory process 500 is described in FIG. 5 as collecting data and providing advisory information generated from the data. In accordance with an embodiment, the advisory information processed by the network advisory process 500 is illustrated as taking the form of a script.

The network advisory process 500 comprises an operation flow beginning with start operation 502 and concluding with termination operation 536. For simplicity, the network advisory process 500 is described below as collecting various forms of data from a destination facility, i.e., 116, 118 or 120, associated with a single customer of a service providing company employing a field service provider 122 to provide a service. Generally, however, the NAS 100 may be used to simultaneously collect various forms of data from multiple customers of the same service providing company. Furthermore, the destination facility 116, 118 or 120 where a service is provided may or may not be associated with a customer.

The network advisory process 500 begins with start operation 502 and passes to collection operations 504, 506 and 508. As an example, and not by limitation, collection operations 504, 506 and 508 collect data associated with a utility device serviced by the service providing company. More specifically, the network advisory process 500 is hereafter described with reference to the utility device being an industrial laundry machine. Device collection operation 504 collects device data 202 associated with the utility device to which the field service provider 122 is providing a service, i.e., some type of maintenance to the laundry machine. Likewise, census collection operation 506 collects census data 204 associated with the utility device to which the field service provider 122 is providing a service and business collection operation 508 collects business data 206 associated with the utility device to which the field service provider 122 is providing a service. As such, the device data 202 collected may relate to machine-wash temperature, the business data 206 collected may relate to the balance due on the laundry machine and the census data 204 collected may relate to the amount of laundry detergent used in the laundry machine over a given period of time.

Once the various forms of data are collected by collection operations 504, 506 and 508, operation flow passes to upload operations 510, 512 and 514. Upload operations 510, 512 and 514 each upload the type of data collected by collection operations 504, 506 and 508, respectively, to one or more databases, such as databases 110, 112 and 114, or 208, accessible to the advisory module 102. As such, device upload operation 510 may upload the collected device data 202 to the master database 208, census upload operation 512 may upload the collected census data 204 to the master database 208 and business upload operation 514 may upload the collected business data 206 to the master database 208.

Once data is uploaded to the master database 208, operation flow passes to initialization operation 515. Initialization operation 515 initializes a clocking mechanism used to reference the length in time that collected data are stored in the master database 208. The clocking mechanism is also preferably used to reference the length in time that advisory information is stored in the storage module 216. Once the timer is initiated, operation flow passes to data storage operation 516. Data storage operation 516 stores the uploaded data in the master database 208 as described in conjunction with FIG. 2, in accordance with an embodiment of the invention.

The data stored in the master database 208 are then analyzed against advisory rules by analysis operation 518. As described above, the advisory rules are not only specific to the general data type, i.e., device, business or census, of the collected data, but also a specific data type related to the origin of the source of the collected data. For instance, whereas water temperature of a conventional laundry reservoir may be analyzed against one or more device data advisory rules specific to water temperature, the velocity of the reservoir spin may be analyzed against one or more device data advisory rules specific to reservoir velocity. An example of such an analysis is described below with reference to FIG. 7. Based on the analysis, data conclusions are generated by generation operation 520. The data conclusions are predefined identifiers associated with each independent result obtained by analysis operation 518. Once the data conclusions are generated, operation flow passes to map operation 522. Map operation 522 maps each data conclusion generated by generation operation 520 to advisory information that relates the results derived by analysis operation 518 to a format recognizable to the field service provider 122. As an example and not a means of limitation, the advisory information may take the form of a script in a textual or an audio and/or visual format. Illustrating this example, FIG. 5 is hereafter described as the network advisory process 500 provides one or more scripts to a field service provider 122. Once the conclusions are mapped, operation flow passes to distinguish operation 524. Distinguish operation 524 distinguishes or organizes the scripts based on data type and customer account. As such, scripts associated with device data 202 are separated from scripts associated with business and census data and scripts associated with one customer account are separated from scripts associated with another customer account.

Operation flow then passes to storage operation 526. Storage operation 526 oversees storage of the scripts in a two-tier organizational storage module 216 based on the organization determined by distinguish operation 524. The scripts are first stored in customer account records 310, which may be identified by the customer account code 304 of each particular customer and account. Within each customer account record 310, the scripts are further divided into data-type records 312 based on the general data-type of the data, i.e., device, business or census. As mentioned above, the data-type records 312 are divisions, or groups, of customer account records 310 such that each customer account record 310 contains at least three data-type records 312: a device data record, a business data record and a census data record.

Once scripts are stored in the storage module 216, operation flow passes to timer operation 530. Timer operation 530 determines whether data and scripts stored in the master database 208 and the storage module 216, respectively, have been maintained in records of the database 208 and module 216 for a predetermined time period. This determination is conducted at a record-by-record level. As described earlier, the clocking mechanism monitored by timing operation 530 is initialized to start counting by initialization operation 515. Once the time of the clocking mechanism reaches "X" count, which is a count of the clocking mechanism in seconds, minutes, hours, or days, operation flow passes from timer operation 530 to flag operation 534. In flag operation 534, data that has been in the records of the master database 208 and the scripts stored in the records of the storage module 216 for "X" amount of time are flagged such that the records storing the data and the scripts are written over during subsequent network advisory process 500 passes. Flag operation 534 may also be referred to as a "data refresh" operation wherein the data flagged by the operation 534 is data that is to be refreshed with updated collected data. Operation flow then passes to start operation 502 and continues as data is collected, uploaded and then stored in the records of the database 208 previously flagged.

If timer operation 530 determines that data and scripts stored in records of the master database 208 and the storage module 216, respectively, have not been maintained in the records for the predetermined time period, operation flow passes to decisional operation 528. Decisional operation 528 awaits access to the NAS 100 by a field service provider 122. In particular, if decisional operation 528 determines that access has not been granted to a field service provider 122, then operation flow passes to timer operation 530 and is continuously looped until either access is granted or the timer operation 530 indicates that the data and scripts have been maintained in the master database 208 and the storage module 216, respectively, for the predetermined time period. Once the NAS 100 is accessed, operation flow passes to transmission operation 532. Transmission operation 532 retrieves the appropriate script requested by the field service provider 122 and transmits the script to the field service provider 122 over the network connection 132 through which the field service provider 122 is connected. Operation flow then concludes at termination operation 536. In accordance with an embodiment, the fact that a script is provided by a field service provider 122 has no bearing on whether the data is thereafter refreshed. Indeed, the field service provider 122 may subsequently access the NAS 100 and retrieve the same script previously accessed so long as the script has not been prepared for refresh by flag operation 534. Alternatively, the NAS 100 may refresh the scripts following each access.

FIG. 6 is a network advisory process 600 more particularly illustrating operations shown in the network advisory process 400 as the NAS 100 generates and provides advisory information to a field service provider 122 in accordance with an alternative embodiment of the present invention.

Specifically, operations 602, 604, 606, 608, 610, 612, 614, 616, 618 and 620 in FIG. 6 are substantially identical to operations 502, 504, 506, 508, 510, 512, 514, 516, 518 and 520 in FIG. 5. As such, in the alternative embodiment described in FIG. 6, mapping advisory information to a data conclusion based on a specific customer and data-type is administered as a field service provider 122 is granted access to the NAS 100. As with FIG. 5, the network advisory process 600 is described in FIG. 6 as collecting data and providing advisory information generated from the data. In accordance with an embodiment of the invention, the advisory information provided by the network advisory process 600 is illustrated as taking the form of a script. The network advisory process 600 comprises an operation flow beginning with start operation 602 and concluding with termination operation 634.

The network advisory process 600 begins with start operation 602 and passes to collection operations 604, 606 and 608. Device data collection operation 604 collects device data 202 associated with a utility device to which the field service provider 122 is providing a service, i.e., some form of maintenance to the device. Likewise, census data collection operation 606 collects census data 204 associated with the utility device, the destination facility 116, 118 or 120 or the customer and business data collection operation 608 collects business data associated with the destination facility 116, 118 or 120, or the customer utility device. As an example, and not a limitation, collection operations 604, 606 and 608 collect data associated with a utility device located at a customer destination facility 116, 118 and 120 and serviced by a service providing company employing the field service provider 122. More specifically, the network advisory process 600 is hereafter described with reference to the utility device being an industrial laundry machine. As such, the device data 202 collected may relate to machine-wash temperature, the business data 206 collected may relate to the balance due on a lease of the laundry machine and the census data 204 collected may relate to the amount of laundry detergent used in the laundry machine over a given period of time.

Once the various forms of data are collected by collection operations 604, 606 and 608, operation flow passes to upload operations 610, 612 and 614. Upload operations 610, 612 and 614 each upload the type of data collected by collection operations 604, 606, and 608, respectively, to one or more databases, such as 110, 112 and/or 114, and/or 208, accessible to the advisory module 102. As such, device upload operation 610 may upload the collected device data 202 to the master database 208, census upload operation 612 may upload the collected census data 204 to the master database 208 and account upload operation 614 may upload the collected business data 206 to the master database 208.

Once data is uploaded to the advisory module 102, operation flow passes to initialization operation 615. Initialization operation 615 initializes a clocking mechanism used to reference the length in time that collected data are stored in the master database 208. In accordance with an embodiment, the clocking mechanism may also be used to reference the length in time that scripts are stored in the storage module 216. Once the timer is initiated, operation flow passes to database storage operation 616. Data storage operation 616 stores the uploaded data in the master database 208 as described with reference to FIG. 2 in accordance with an embodiment of the present invention.

The data stored in the master database 208 are then analyzed against one or more advisory rules by analysis operation 618. As noted above, each advisory rule may include one or more advisory conditions associated with operating and/or threshold parameters related to the general and specific data type of each data sample. An example of such an analysis is described below with reference to FIG. 7. Based on the analysis, data conclusions are generated by generation operation 620. The data conclusions are predefined identifiers associated with each independent result obtained by analysis operation 618. Once the conclusions are generated, operation flow passes to conclusion storage operation 622. Conclusion storage operation 622 oversees storage of the conclusions in a two-tier organizational storage module 216. The conclusions are stored in customer account records 310 which may be identified by the customer account code 304 associated with each particular customer. Within each customer account record 310, the conclusions are further divided into data-type records 312 based on the general data-type, i.e., device, account and census, associated with the conclusion. As mentioned above, the data-type records 312 are divisions, or groups, of customer account records 310 such that each customer account record 310 contains at least three data-type records 312: a device data record, a business data record and a census data record.

Once the data conclusions are stored by conclusion storage operation 622, operation flow passes to timer operation 624. Timer operation 624 determines whether collected data and data conclusions stored in the master database 208 and the storage module 216, respectively, have been maintained in records of the database 208 and the storage module 216 for a predetermined time period. This determination is concluded at a record-by-record level. As described earlier, the clocking mechanism monitored by timing operation 624 is initialized to start counting by initialization operation 615. Once the time of the clocking mechanism reaches "X" count, which is a count of the clocking mechanism in seconds, minutes, hours, or days, operation flow passes from timer operation 624 to flag operation 626. Flag operation 626 flags data that has been stored in the records of the master database 208 and data conclusions stored in the records of the storage module 216 for "X" amount of time such that the records storing the data and the conclusions are written over during subsequent network advisory process 600 passes. Flag operation 526 may also be referred to as a data refresh operation wherein the data flagged by the operation 526 is data that is to be refreshed with updated collected data. Operation flow then passes to start operation 602 and continues as data is collected, uploaded and then stored in the records of the database 208 previously flagged.

If timer operation 624 determines that data and conclusions stored in records of the master database 208 and the storage module 216, respectively, have not been maintained in the records for the predetermined time period, operation flow passes to decisional operation 628. Decisional operation 628 awaits access to a specific customer account record 310 and specific data-type record 312 by a field service provider 122. In particular, if decisional operation 628 determines that access has not been granted to a field service provider 122, operation flow passes to timer operation 624 and is continuously looped until either access is granted or the timer operation 624 indicates that collected data and data conclusions have been maintained in the records of the database 208 and the storage module 216, respectively, for the predetermined time period. Once the NAS 100 is accessed, operation flow passes to map operation 630.

Map operation 630 maps the conclusion associated with the specific data-type record 312 to which the field service provider 122 is granted access to a script. The scripts are mapped based on the identifier of the data conclusion. As mentioned above, the scripts may be in textual, binary or audio and/or visual format. More detailed illustrations of the operations of the map operation 630 are shown and described above in Table 2 and below in FIG. 8. Once an appropriate script is mapped based on the customer account and the data type associated with the request, the script is then transmitted to the field service provider 122 by transmission operation 732. The script is transmitted over the network connection 132 through which the field service provider 122 is connected. Operation flow then concludes at termination operation 634. In accordance with an embodiment, the fact that a script is accessed by a field service provider 122 has no bearing on whether the data is thereafter refreshed. Indeed, the field service provider 122 may subsequently access the NAS 100 and retrieve the same script previously accessed, so long as the data has not been prepared for refresh by flag operation 626. Alternatively, the NAS 100 may refresh the scripts following each access.

Figure 7:
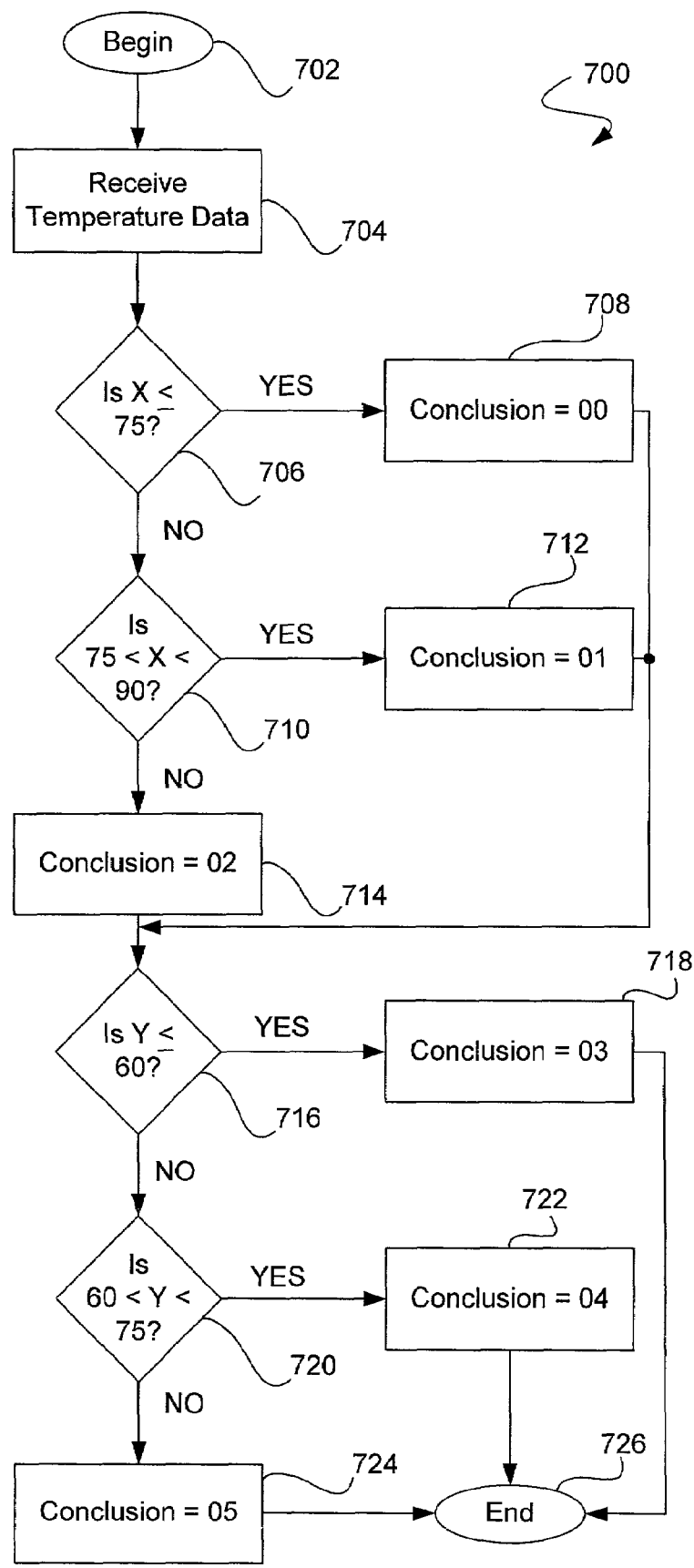
FIG. 7 is a flow diagram that illustrates operational characteristics related to generating a data conclusion from a sample of collected data in accordance with an embodiment of the present invention.

FIG. 7 is an illustration of operations performed by the analysis operation 518 and, in the alternative embodiment in FIG. 6, analysis operation 618, as the analysis operations 518, 618 analyze a collected sample of data against various advisory conditions of an advisory rule related to the sample of data. FIG. 7 also illustrates operations performed by generation operation 520 and, in the alternative embodiment in FIG. 6, generation operation 620, as the generation operations 520, 620 generate a data conclusion based on the aforementioned analysis. Specifically, an analysis/generation process 700 illustrates operations associated with analysis operations 518, 618 and generation operations 520, 620 as the analysis operations 518, 618 analyze a sample of device data 202 against an advisory rule associated with a conventional laundry machine and generation operations 520, 620 generate a data conclusion based on the analysis. The analysis/generation process 700 illustrates a sample of data being analyzed against four advisory conditions, i.e. operations 706, 710, 716 and 720, of the advisory rule. As mentioned, advisory conditions relate the collected data to operating and/or threshold parameters by comparing the parameters to the collected data. In the illustration of FIG. 7, the operating parameters are the degrees of water temperature in Fahrenheit, such as 75 degrees in operations 706 and 710, as described below. Whereas the analysis/generation process 700 illustrates analysis of a data sample against an advisory rule having only four advisory conditions for simplicity, it should be appreciated that an advisory rule may be much more complex, including any number of advisory conditions, which in turn, may include any number of operating and/or threshold parameters. The analysis/generation process 700 comprises an operation flow beginning with start operation 702 and concluding with termination operation 726.

The analysis/generation process 700 begins in start operation 702 following the conclusion of data storage operation 516 and, alternatively, data storage operation 616. Operation flow then passes to reception operation 704 as a sample of device data 202 is received into the intelligence module 210. Specifically, as an example to illustrate FIG. 7 and not as means of limitation, the sample of device data 202 received by reception operation 704 is data related to the water temperature of a conventional laundry machine. The sample contains an "X" parameter and a "Y" parameter. The "X" temperature parameter is used to specify the temperature of the machine-wash during the normal cycle and the "Y" temperature parameter is used to specify the temperature of the machine-wash during final rinse.

Once the sample of device data is received by reception operation 704, operation flow passes to decisional operation 706. Decisional operation 706 determines whether the temperature of the machine-wash during normal cycle is less than or equal to 75 degrees Fahrenheit. If the machine-wash during normal cycle is less than or equal to 75 degrees Fahrenheit, operation flow passes to generate conclusion operation 708. Generate conclusion operation 708 assigns a data conclusion of "00" to the machine-wash temperature during normal cycle. Once the data conclusion is generated, operational flow passes to decisional operation 716. If decisional operation 706 determines that the temperature of the machine-wash during normal cycle is not less than or equal to 75 degrees Fahrenheit, operation flow passes to decisional operation 710.

Decisional operation 710 determines whether the temperature of the machine-wash during normal cycle is between 75 degrees Fahrenheit and 90 degrees Fahrenheit. If the machine-wash during normal cycle is between 75 degrees Fahrenheit and 90 degrees Fahrenheit, operation flow passes to generate conclusion operation 712. Generate conclusion operation 712 assigns a conclusion of "01" to the machine-wash temperature during normal cycle. Once the data conclusion is generated, operational flow passes to decisional operation 716. If decisional operation 710 determines that the temperature of the machine-wash during normal cycle is not between 75 degrees Fahrenheit and 90 degrees Fahrenheit, operation flow passes to generate conclusion operation 714. Generate conclusion operation 714 assigns a conclusion of "02" to the machine-wash temperature during normal cycle.

Following generate conclusion operations 708, 712 and 714, operation flow passes to decisional operation 716. Decisional operation 716 determines whether the machine-wash temperature at final rinse is less than or equal to 60 degrees Fahrenheit. If the machine-wash temperature during normal cycle is less than or equal to 60 degrees Fahrenheit, operation flow passes to generate conclusion operation 718. Generate conclusion operation 718 assigns a conclusion of "03" to the machine-wash temperature during final rinse. Once the data conclusion is generated, operational flow is concluded at termination operation 726. If decisional operation 716 determines that the temperature of the machine-wash during final rinse is not less than or equal to 60 degrees Fahrenheit, operation flow passes to decisional operation 720.

Decisional operation 720 determines whether the temperature of the machine-wash during final rinse is between 60 degrees Fahrenheit and 75 degrees Fahrenheit. If the machine-wash during final rinse is between 60 degrees Fahrenheit and 75 degrees Fahrenheit, operation flow passes to generate conclusion operation 722. Generate conclusion operation 722 assigns a conclusion of "04" to the machine-wash temperature during final rinse. Once the data conclusion is generated, operation flow concludes at termination operation 726. If decisional operation 720 determines that the temperature of the machine-wash during final rinse is not between 60 degrees Fahrenheit and 75 degrees Fahrenheit, operation flow passes to generate conclusion operation 724. Generate conclusion operation 724 assigns a conclusion of "05" to the machine-wash temperature during final rinse. Once the conclusion is generated, operation flow is concluded at termination operation 726.

Figure 8:
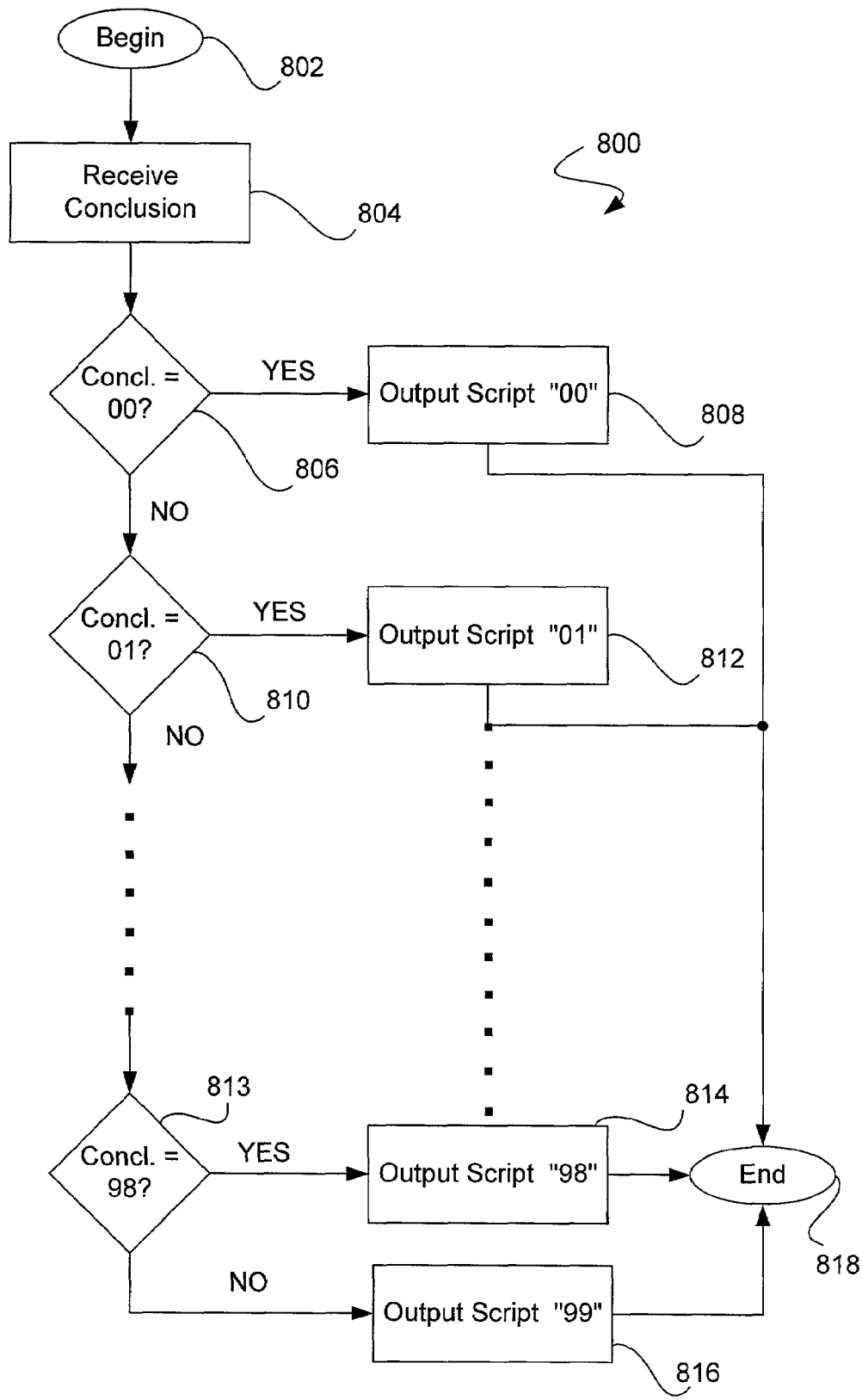
FIG. 8 is a flow diagram that illustrates operational characteristics related to mapping the data conclusion generated in the flow diagram of FIG. 7 to advisory information in accordance with an embodiment of the present invention.

FIG. 8 is an illustration of the operations performed by map operation 522 and, in the alternative embodiment in FIG. 6, map operation 630, as specific advisory information is mapped to a data conclusion generated by generation operation 520 and, alternatively in FIG. 6, generation operation 620. As such, the advisory information described in FIG. 7 takes the form of a script as an illustration of analysis operations 516, 518 and generation operations 520, 620 in the network advisory processes 500 and 600, respectively. Specifically, a mapping process 800 is shown mapping a data conclusion derived by the analysis performed in the analysis/generation process 700 in FIG. 7 to a script in a format recognizable to a field service provider 122. For simplicity, the mapping process 800 is shown receiving a single data conclusion to be mapped to a script. Once the conclusion is mapped, the mapping process 800 is initialized to await reception of a subsequent data conclusion. The mapping process 800 comprises an operation flow beginning with start operation 800 and concluding with termination operation 818. Once at termination operation 818, operation flow is initialized to begin at start operation 802 as a subsequent data conclusion is received.

The mapping process 800 begins at start operation 802 and operation flow initially passes to reception operation 804. Reception operation 804 receives a data conclusion, such as a data conclusion generated by the analysis/generation process 700. With respect to network advisory processes 500 and 600, reception operation 804 receives the data conclusion following either generation operation 520 or, in the alternative embodiment in FIG. 6, decisional operation 628. If reception operation 804 follows generation operation 520, the conclusion is preferably received into reception operation 804 directly and without an access of the customer and data-type records 310 and 312, respectively. In contrast, if reception operation 804 follows decisional operation 628, reception operation 804 first accesses the customer and data-type records 310 and 312, respectively, based on the identification code 302 and the customer account code 304 input by the field service provider 122. As such, once the appropriate record is accessed, reception operation 804 receives the data conclusion stored in the record.

Following reception of the data conclusion, operation flow passes to decisional operation 806. Decisional operation 806 determines whether the received data conclusion is identified as "00." If the conclusion is identified as "00," operation flow passes to output script operation 808. Output script operation 808 outputs the script associated with the "00" identifier to the storage module 216 where the script is stored in the appropriate customer 310 and data-type 312 records. In the alternative embodiment illustrated in FIG. 6, output script operation 808 outputs the script associated with the "00" identifier to the field service provider 122 in accordance with transmission operation 632. In accordance with the example illustrated in Table 2, the script associated with the "00" identifier may be an audio script dictating that "the machine-wash temperature is below the expected range." Once the script is output to either the storage module 216 or the field service provider 122, operation flow concludes with termination operation 818.

If decisional operation 806 determines that the conclusion received by reception operation 804 is not identified as "00," operation flow passes to decisional operation 810. Decisional operation 810 determines whether the conclusion received by reception operation 804 is identified as "01." If the conclusion is identified as "01," operation flow passes to output script operation 812. Output script operation 812 outputs the script associated with the "01" identifier to the storage module 216 where the script is stored in the appropriate customer 310 and data-type 312 records. In the alternative embodiment illustrated in FIG. 6, output script operation 812 outputs the script associated with the "01" identifier to the field service provider 122 in accordance with transmission operation 632. In accordance with the example illustrated in Table 2, the script associated with the "01" identifier is an audio script dictating that "the machine-wash temperature is within the expected range." Once the script is output to either the storage module 216 or the field service provider 122, operation flow concludes with termination operation 818. However, if decisional operation 810 determines that the data conclusion received by reception operation 804 is not identified as "01," operation flow continues to compare the received conclusion with all possible identifiers from "01" to "98," which in the example in FIG. 8 is the next to last possible identifier associated with data conclusions.

If operation flow reaches decisional operation 812, then decisional operation 812 determines whether the conclusion identifier is "98." If the conclusion identifier is "98," operation flow passes to output script operation 814. Output script operation 814 outputs the script associated with the "98" identifier to the storage module 216 where the script is stored in the appropriate customer 310 and data-type 312 records. In the alternative embodiment illustrated in FIG. 6, output script operation 814 outputs the script associated with the "98" identifier to the field service provider 122 in accordance with transmission operation 632. Once the script is output to either the storage module 216 or the field service provider 122, operation flow concludes with termination operation 818. However, if decisional operation 812 determines that the conclusion identifier is not "98," then operation flow passes to output script operation 816. Operation script operation 816 outputs the script associated with the "99" identifier to the storage module 216 where the script is stored in the appropriate customer 310 and data-type 312 records. In the alternative embodiment illustrated in FIG. 6, output script operation 816 outputs the script associated with the "99" identifier to the field service provider 122 in accordance with transmission operation 632. Once the script is output to either the storage module 216 or the field service provider 122, operation flow concludes with termination operation 818.

Figure 9:
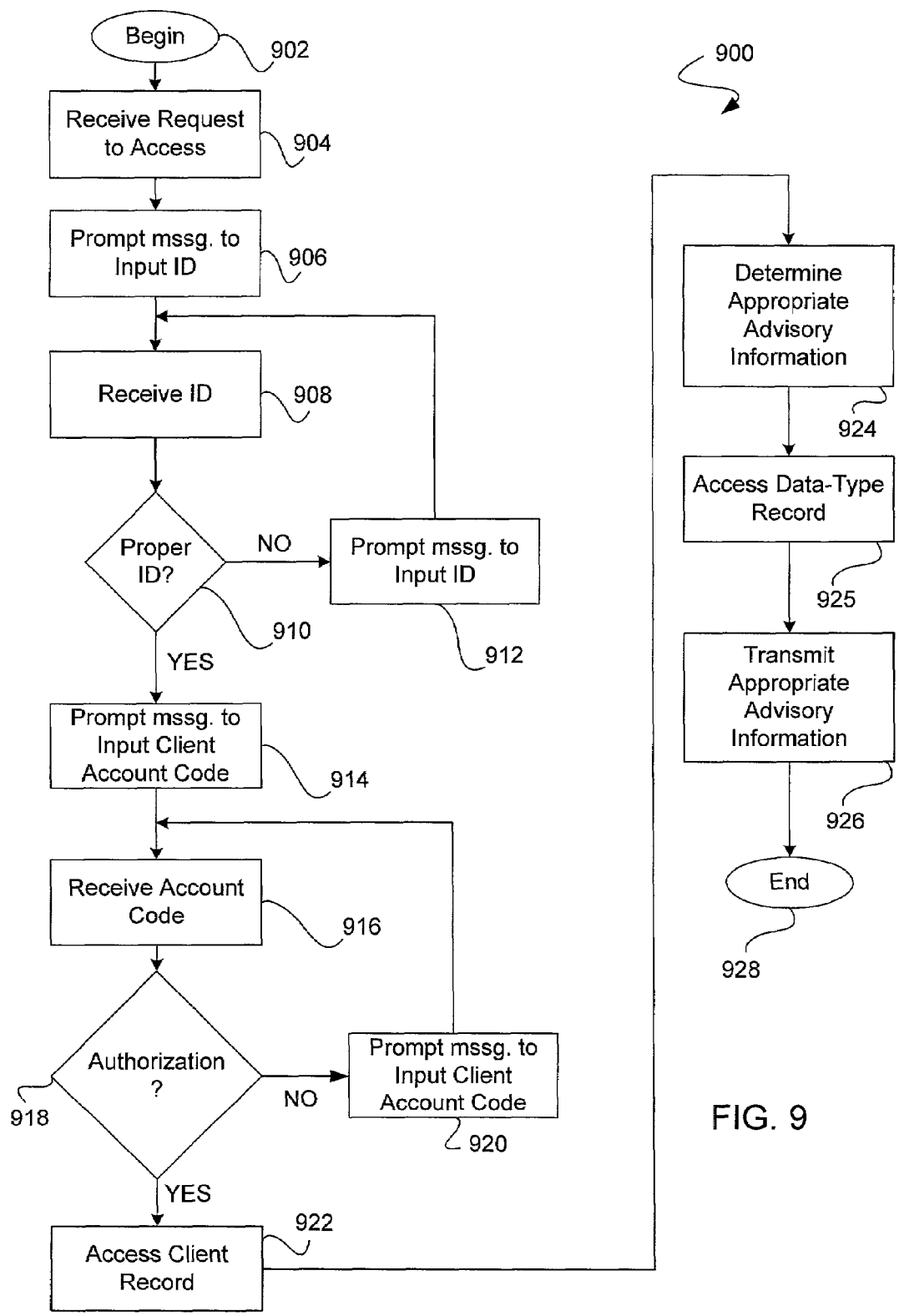
FIG. 9 is a flow diagram that illustrates operational characteristics related to identifying and authenticating a field service provider connected to the network advisory system of FIG. 1 over a network connection in accordance with an embodiment of the present invention.

FIG. 9 illustrates operations of the R/C module 214 as the module 214 manages the granting of access to the NAS 100 and the retrieval and transmittal of advisory information from the NAS 100 to a network-connected field service provider 122 in accordance with one embodiment of the present invention. In particular, FIG. 9 shows an identification and authentication process 900 illustrating operations of the R/C module 214 of the NAS 100. As an example and not a means of limitation, the field service provider 122 described in conjunction with FIG. 9 is employed by a service providing company to provide service on the company's behalf to one or more destination facilities each associated with a single customer. As such, the field service provider 122 accesses specific customer 310 and data-type 312 records through an identification/authorization process 900. In accordance with a preferred embodiment of the present invention and as shown in FIG. 1 at times $t_1$ and $t_3$, the field service provider 122 may connect to the NAS 100, gain access to the NAS 100 and receive advisory information by the NAS 100 while the field service provider 122 is in transit between destination facilities. The times $t_1$ and $t_3$ are typically referred to a "windshield time."

The identification/authentication process 900 comprises an operation flow beginning with start operation 902 and concluding with termination operation 928. From start operation 902, operation flow passes to reception operation 904. Reception operation 904 is triggered to receive a request to access the NAS 100 once a field service provider 122 connects to the NAS 100 through a network connection 132 to the R/C module 214. Once a request to access is received, operation flow passes to prompt identification code operation 906. Prompt identification code operation 906 prompts the field service provider 122 to enter the identification code 302 specific to the field service provider 122. From prompt identification code operation 906, operation flow passes to reception operation 908.

At reception operation 908, the field service provider 122 enters his/her identification code 302 and the NAS 100 receives the identification code 302 through the R/C module 214. In accordance with various embodiments, the field service provider 122 may input the identification code 302 using any conventional input methods including, without limitation, voice recognition, retinal recognition, fingerprint recognition, touch-tone recognition, keyboard entry, computer mouse entry or any other input method allowing a user to gain access to a remote computer. From reception operation 908, operation flow passes to decisional operation 910. Decisional operation 910 determines whether the identification code 302 received by reception operation 908 is a valid identification code 302 specifying a field service provider 122 that is employed by the service providing company. If decisional operation determines that the identification code 302 is not a valid identification code, operation flow passes to second prompt identification code operation 912. Second prompt identification code operation 912 prompts the user that the previously entered identification code 302 is invalid and requests the user to input a second identification code 302. From second prompt identification code operation 912, operation flow returns to reception operation 908 and continues as discussed above. In accordance with an embodiment, a security module may be tied to the second prompt identification code operation 912 to maintain a record of the number of times that the NAS 100 has been incorrectly accessed during a current logon session. If an invalid identification code 302 is input a predetermined number of times during the current logon session, then the authentication/identification process 900 automatically terminates.

If decisional operation 910 determines that the identification code 302 entered is a valid identification code 302, then the field service provider 122 is recognized a NAS user and operation flow passes to prompt customer account code operation 914. Prompt customer account code operation 914 prompts the field service provider 122 to input a customer account code 304 specific to the customer account that is to be provided a service. From prompt customer account code operation 914, operation flow passes to reception operation 916.

Reception operation 916 receives the customer account code 304 through the R/C module 214. In accordance with various embodiments, the field service provider 122 may input the identification code 302 using any conventional input methods including, without limitation, voice recognition, fingerprint recognition, retinal recognition, touch-tone recognition, keyboard entry, computer mouse entry or any other input method allowing a user to gain access to a remote computer. From reception operation 916, operation flow passes to decisional operation 918. Decisional operation 918 determines whether the field service provider 122 is a field service provider that should be granted access to the customer account record 310 of the customer of which the customer account code 304 specifies. If access to the customer account record 310 by the field service provider 122 is proper, operation flow passes to access operation 922. Access operation 922 grants access to the customer account record 310 associated with the customer account code 304. If decisional operation 918 determines that access is not proper, operation flow passes to second prompt customer account code operation 920. Second prompt customer account code operation 920 prompts the user that the previously entered customer account code 304 is associated with a customer account record 310 of which the field service provider 122 does not have access. The second prompt customer account code operation 920 also requests the user to input a second customer account code 304. From second prompt customer account code operation 920, operation flow returns to reception operation 916 and continues as discussed above. In accordance with an embodiment, a security module may be tied to the second prompt customer account code operation 920 to maintain a record of the number of times that the NAS 100 has been incorrectly accessed. If an invalid customer account code 304 is input a predetermined number of times, then the authentication/identification process 900 automatically terminates.

Once access operation 922 has granted the field service provider 122 access to the customer account records 310, operation flow passes to determination operation 924. Determination operation 924 determines which data-type record 312 of the customer account record 310 stores the advisory information that the field service provider 122 is requesting. As described in Table 3, this determination is based on a specialty area of the field service provider 122 and the particular customer account identified by the customer account record 310 of which the field service provider 122 is currently accessing. Once determination operation has determined the data-type record 312 storing the appropriate advisory information requested by the field service provider 122, operation flow passes to retrieval operation 926. Retrieval operation 926 accesses the appropriate data-type record 312 specified by determination operation 924 and retrieves the advisory information stored in the record 312. Once the appropriate advisory information is retrieved, operation flow passes to transmission operation 926. Transmission operation 926 transmits the retrieved advisory information to the field service provider 122 over the network connection 132 through which the field service provider 122 is connected. From transmission operation 926, operation flow concludes with termination operation 928.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, although a field service provider is described above as providing commercial or private services typically under some form of agreement, the field service provider may be employed by an emergency or public service providing company, such as a fire rescue unit, a police unit, a veterinary service, a hospitals and/or ambulance service, or any other service providing company generally employed to provide emergency services. Numerous other changes may be made which will readily suggest themselves to those skilled in the art and which are encompassed in the spirit of the invention disclosed and as defined in the appended claims.

What is claimed is:

1. In a computer network having a server computer communicating with field service providers through network devices, a method in the server computer for providing advisory information to the field service providers, the method comprising:
   receiving a plurality of collected data related to a destination facility, each of the plurality of collected data being associated with one of a plurality of data types;
   generating data conclusions based on an analysis between each of the plurality of collected data and an advisory rule corresponding to the data type of the collected data being analyzed;
   mapping the data conclusions to advisory information;
   storing the advisory information in a storage module for subsequent access by the field service providers, wherein the storage module comprises a plurality of data type records, the advisory information being categorized in the plurality of data type records based on the data type of the collected data from which the advisory information is derived;
   receiving a request from a specific field service provider for presentation of advisory information, the request comprising a provider identification code associated with the specific field service provider and representative of a specific data type of advisory information that the specific field service provider is authorized to access; and
   in response to receipt of the request, retrieving advisory information from a specific data type record of the storage module based on the provider identification code; and
   presenting the retrieved advisory information to the specific field service provider through the network device.

2. A method as defined in claim 1, wherein the receiving act comprises:
   collecting device data associated with a utility device maintained at the destination location;
   collecting business data associated with a customer of a service providing company employing the field service provider to provide a service to the customer at the destination facility; and
   collecting census data associated with the destination facility.

3. A method as defined in claim 1, wherein the network device is a wireless interface module and the presenting act comprises:
   transmitting the retrieved advisory information to the wireless interface module via a wireless network connection.

4. A method as defined in claim 3, wherein the transmitting act comprises transmitting the retrieved advisory information to the wireless interface module as the specific field service provider is in transit between a first destination facility and a second destination facility.

5. A method as defined in claim 3, wherein the wireless interface module is a wireless telephone and the presenting act comprises:
   providing the retrieved advisory information as a script in an audio format.

6. A method as defined in claim 1, wherein the presenting act comprises:

providing the retrieved advisory information as a script in a format based on the network device through which the specific field service provider is communicating to the computer network.

7. A method as defined in claim 6, wherein the script is in an audio format.

8. A method as defined in claim 6, wherein the script is in a visual format.

9. A method as defined in claim 6, wherein the script is in a textual format.

10. A method as defined in claim 1, wherein the specific field service provider provides a service at the destination facility based on the retrieved advisory information.

11. A method as defined in claim 1, wherein the storage module further comprises a plurality of customer account records the advisory information to which each data conclusion is mapped being further categorized in the storage module within the customer account records, wherein the retrieving act comprises:
    accessing the specific data type record and a specific customer account record based on the provider identification code.

12. A method as defined in claim 1, wherein the storage module further comprises a plurality of customer account records the advisory information to which each data conclusion is mapped being further categorized in the storage module within the customer account records, wherein each of the plurality of customer account records is associated with at least a plurality of the data type records, the retrieving act comprising:
    accessing a specific customer account record based on a customer account code input to the computer network by the specific field service provider communicating via the network device, wherein the specific data type record is one of the plurality of data type records associated with the specific customer account record.

13. A method as defined in claim 12, wherein the provider identification code comprises a specialty area code corresponding to a specialty area associated with the specific field service provider, the act of accessing a specific data-type record comprising:
    selecting the specific data-type record based on the specialty area code.

14. A computer program product embodied on a computer readable medium readable by a computing system and encoding a computer program of instructions for executing a computer process for providing advisory information to field service providers communicating with the computing system over a computer network via network devices, the computer process comprising:
    receiving a plurality of collected data related to a destination facility, each of the plurality of collected data being associated with one of a plurality of data types;
    generating data conclusions based on an analysis between each of the plurality of collected data and an advisory rule corresponding to the data type of the collected data being analyzed;
    mapping the data conclusions to advisory information;
    storing the advisory information in a storage module for subsequent access by the field service providers, wherein the storage module comprises a plurality of data type records, the advisory information being categorized in the plurality of data type records based on the data type of the collected data from which the advisory information is derived;
    receiving a request from a specific field service provider for presentation of advisory information, the request comprising a provider identification code associated with the specific field service provider and representative of a specific data type of advisory information that the specific field service provider is authorized to access; and
    in response to receipt of the request, retrieving advisory information from a specific data type record of the storage module based on the provider identification code; and
    presenting the retrieved advisory information to the specific field service provider through the network device.

15. The computer process in the computer program product of claim 14, wherein the receiving act comprises:
    collecting device data associated with a utility device maintained at the destination location;
    collecting business data associated with a customer of a service providing company employing the field service provider to provide a service to the customer at the destination facility; and
    collecting census data associated with the destination facility.

16. The computer process in the computer program product of claim 14, wherein the network device is a wireless interface module and the presenting act comprises:
    transmitting the retrieved advisory information to the wireless interface module via a wireless network connection.

17. The computer process in the computer program product of claim 16, wherein the transmitting act comprises transmitting the retrieved advisory information to the wireless interface module as the specific field service provider is in transit between a first destination facility and a second destination facility.

18. The computer process in the computer program product of claim 16, wherein the wireless interface module is a wireless telephone and the presenting act comprises:
    providing the retrieved advisory information as a script in an audio format.

19. The computer process in the computer program product of claim 14, wherein the presenting act comprises:
    providing the retrieved advisory information as a script in a format based on the network device through which the specific field service provider is communicating to the computer network.

20. The computer process in the computer program product of claim 19, wherein the script is in an audio format.

21. The computer process in the computer program product of claim 19, wherein the script is in a visual format.

22. The computer process in the computer program product of claim 19, wherein the script is in a textual format.

23. The computer process in the computer program product of claim 14, wherein the specific field service provider provides a service at the destination facility based on the retrieved advisory information.

24. The computer process in the computer program product of claim 14, wherein the storage module further comprises a plurality of customer account records the advisory information to which each data conclusion is mapped being further categorized in the storage module within the customer account records, wherein the retrieving act comprises:
    accessing the specific data type record and a specific customer account record based on the provider identification code.

25. The computer process in the computer program product of claim 14, wherein the storage module further comprises a plurality of customer account records the advisory information to which each data conclusion is mapped being further categorized in the storage module within the customer account records, wherein each of the plurality of customer account records is associated with at least a plurality of the data type records, the retrieving act comprising:
  accessing a specific customer account record based on a customer account code input to the computer network by the specific field service provider communicating via the network device, wherein the specific data type record is one of the plurality of data type records associated with the specific customer account record.

26. The computer process in the computer program product of claim 25, wherein the provider identification code comprises a specialty area code corresponding to a specialty area associated with the specific field service provider, the act of accessing a specific data-type record comprising:
  selecting the specific data-type record based on the specialty area code.

27. A method as defined in claim 1, wherein the provider identification code comprises a specialty area code corresponding to a specialty area associated with the specific field service provider, the retrieving act comprising:
  selecting the specific data-type record based on the specialty area code.

28. A method as defined in claim 1, wherein the plurality of data type records comprise one or more business data type records and one or more device data type records.

29. A method as defined in claim 28, wherein the provider identification code represents that the specific field service provider is authorized to access advisory information derived from device data, the retrieving act comprising:
  accessing the specific data type record from the one or more device data type records and retrieving advisory information therefrom.

30. A method as defined in claim 28, wherein the provider identification code represents that the specific field service provider is authorized to access advisory information derived from business data, the retrieving act comprising:
  accessing the specific data type record from the one or more business data type records and retrieving advisory information therefrom.

31. A method as defined in claim 2, wherein the plurality of data type records comprise a device data type record, a business data type record and a census data type record, the storing act comprising:
  storing advisory information derived from the collected device data in the device data type record;
  storing advisory information derived from the collected business data in the business data type record; and
  storing advisory information derived from the collected census data in the census data type record.

32. A method as defined in claim 1, wherein the receiving act comprises:
  collecting device data associated with a utility device maintained at the destination location; and
  collecting business data associated with a customer of a service providing company employing the field service provider to provide a service to the customer at the destination facility.

33. A method as defined in claim 32, wherein the plurality of data type records comprise a device data type record and a business data type record, the specific data type recording being one of the device data type record and the business data type record and wherein the storing act comprises:
  storing advisory information derived from the collected device data in the device data type record; and
  storing advisory information derived from the collected business data in the business data type record.

34. A method as defined in claim 33, wherein the device data type record and the business data type record are categorized in the storage module as being associated with a specific customer account record associated with the destination location, the retrieving act further comprising:
  accessing the specific customer account record based on the provider identification code.

35. A method as defined in claim 33, wherein the device data type record and the business data type record are categorized in the storage module as being associated with a specific customer account record associated with the destination location, the retrieving act further comprising:
  accessing the specific customer account record based on a customer account code input to the computer network by the specific field service provider in addition to the provider identification code.

36. The computer process in the computer program product of claim 14, wherein the provider identification code comprises a specialty area code corresponding to a specialty area associated with the specific field service provider, the retrieving act comprising:
  selecting the specific data-type record based on the specialty area code.

37. The computer process in the computer program product of claim 14, wherein the plurality of data type records comprise one or more business data type records and one or more device data type records.

38. The computer process in the computer program product of claim 37, wherein the provider identification code represents that the specific field service provider is authorized to access advisory information derived from device data, the retrieving act comprising:
  accessing the specific data type record from the one or more device data type records and retrieving advisory information therefrom.

39. The computer process in the computer program product of claim 37, wherein the provider identification code represents that the specific field service provider is authorized to access advisory information derived from business data, the retrieving act comprising:
  accessing the specific data type record from the one or more business data type records and retrieving advisory information therefrom.

40. The computer process in the computer program product of claim 15, wherein the plurality of data type records comprise a device data type record, a business data type record and a census data type record, the storing act comprising:
  storing advisory information derived from the collected device data in the device data type record;
  storing advisory information derived from the collected business data in the business data type record; and
  storing advisory information derived from the collected census data in the census data type record.

41. The computer process in the computer program product of claim 14, wherein the receiving act comprises:
  collecting device data associated with a utility device maintained at the destination location; and
  collecting business data associated with a customer of a service providing company employing the field service provider to provide a service to the customer at the destination facility.

42. The computer process in the computer program product of claim 41, wherein the plurality of data type records comprise a device data type record and a business data type record, the specific data type recording being one of the device data type record and the business data type record and wherein the storing act comprises:
  storing advisory information derived from the collected device data in the device data type record; and storing advisory information derived from the collected business data in the business data type record.

43. The computer process in the computer program product of claim 42, wherein the device data type record and the business data type record are categorized in the storage module as being associated with a specific customer account record associated with the destination location, the retrieving act further comprising:

accessing the specific customer account record based on the provider identification code.

44. The computer process in the computer program product of claim 42, wherein the device data type record and the business data type record are categorized in the storage module as being associated with a specific customer account record associated with the destination location, the retrieving act further comprising:

accessing the specific customer account record based on a customer account code input to the computer network by the specific field service provider in addition to the provider identification code.

* * * * *